(12) United States Patent
Minotani et al.

(10) Patent No.: US 12,040,903 B2
(45) Date of Patent: Jul. 16, 2024

(54) BASE STATION, TERMINAL, TRANSMISSION METHOD AND RECEPTION METHOD

(71) Applicant: Panasonic Intellectual Property Corporation of America, Torrance, CA (US)

(72) Inventors: Jun Minotani, Ishikawa (JP); Takashi Iwai, Ishikawa (JP); Tomofumi Takata, Ishikawa (JP); Yoshio Urabe, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 358 days.

(21) Appl. No.: 17/433,554

(22) PCT Filed: Jan. 22, 2020

(86) PCT No.: PCT/JP2020/002155
§ 371 (c)(1),
(2) Date: Aug. 24, 2021

(87) PCT Pub. No.: WO2020/179259
PCT Pub. Date: Sep. 10, 2020

(65) Prior Publication Data
US 2022/0158768 A1 May 19, 2022

(30) Foreign Application Priority Data

Mar. 7, 2019 (JP) ................................ 2019-041687

(51) Int. Cl.
*H04L 29/06* (2006.01)
*H04L 1/1812* (2023.01)
(Continued)

(52) U.S. Cl.
CPC ........... *H04L 1/1812* (2013.01); *H04W 72/20* (2023.01)

(58) Field of Classification Search
None
See application file for complete search history.

(56) References Cited

U.S. PATENT DOCUMENTS 10,575,314 B2 * 2/2020 Park ...................... H04L 5/0078
11,343,019 B2 * 5/2022 Tanaka .................. H04W 84/12
(Continued)

FOREIGN PATENT DOCUMENTS

EP           3780447 B1 *  5/2023  ........... H04L 1/1607
JP           2017-092686 A  5/2017
WO           2018/116564    6/2018

OTHER PUBLICATIONS

International Search Report, dated Apr. 14, 2020, for International Application No. PCT/JP2020/002155, 5 pages. (with English translation).
(Continued)

*Primary Examiner* — Sithu Ko
(74) *Attorney, Agent, or Firm* — Seed IP Law Group LLP

(57) ABSTRACT

A downlink wireless transmission device comprising: a control circuit that generates common information that is common to a plurality of users and unique user information that is unique to each of the plurality of users and corresponds to information pertaining to retransmission control, said common and unique information including information pertaining to retransmission control for each of the plurality of users; and a transmission circuit that transmits control signals including the common information and the unique user information.

12 Claims, 25 Drawing Sheets

(51) Int. Cl.
H04W 52/36 (2009.01)
H04W 72/20 (2023.01)

(56) References Cited

U.S. PATENT DOCUMENTS

| | | | | |
|---|---|---|---|---|
| 11,533,133 B2* | 12/2022 | Chun | .................. | H04L 5/00 |
| 2017/0181129 A1* | 6/2017 | Bharadwaj | ............ | H04W 72/12 |
| 2019/0306885 A1* | 10/2019 | Hirata | .................. | H04W 84/12 |
| 2020/0280399 A1* | 9/2020 | Kim | .................. | H04L 1/1864 |
| 2021/0409165 A1* | 12/2021 | Wang | .................. | H04L 1/1822 |

OTHER PUBLICATIONS

LAN/MAN Standards Committee of the IEEE Computer Society, "Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN," IEEE P802.11ax/D3.0, Jun. 2018.

Latif et al., "HARQ in EHT," IEEE 802.11-18/2029r1, Nov. 12, 2018.

* cited by examiner

100

200

300

400

| HARQ Type | Additional subfield |
|---|---|
| New | None |
| CC | None |
| IR | RV |

FIG. 17A

| HARQ Type | Additional subfield |
|---|---|
| New | None |
| Retransmission | RV |

FIG. 17B

| HARQ Type | Additional subfield |
|---|---|
| New | None |
| CC | NDI |
| IR | NDI and RV |

FIG. 20

| RU Allocation (8 bit) | #1 | #2 | #3 | #4 | #5 | #6 | #7 | #8 | #9 |
|---|---|---|---|---|---|---|---|---|---|
| 11100001 (Reserved pattern) | 52 | | 52 | | 26 | 52 | | 52 (HARQ retransmission) | |
| 11100010 (Reserved pattern) | 52 | | 52 | | 26 | 52 (HARQ retransmission) | | 52 | |
| ⋮ | | | | | ⋮ | | | | |
| 11111111 (Reserved pattern) | 52 (HARQ retransmission) | | 52 (HARQ retransmission) | | 26 (HARQ retransmission) | 52 (HARQ retransmission) | | 52 (HARQ retransmission) | |

FIG. 30

| RU Allocation (8 bit) | #1 | #2 | #3 | #4 | #5 | #6 | #7 | #8 | #9 |
|---|---|---|---|---|---|---|---|---|---|
| 00010000 | 52 | | 52 | | – | 106 (SU-MIMO, New) | | | |
| 00010001 | 52 | | 52 | | – | 106 (2 STA MU-MIMO, New) | | | |
| 00010010 | 52 | | 52 | | – | 106 (3 STA MU-MIMO, New) | | | |
| 00010011 | 52 | | 52 | | – | 106 (4 STA MU-MIMO, New) | | | |
| ⋮ | | | | | ⋮ | | | | |
| 11100001 (Reserved pattern) | 52 | | 52 | | – | 106 (SU-MIMO, Retransmission) | | | |

FIG. 31

| RU Allocation (8 bit) | #1 | #2 | #3 | #4 | #5 (HARQ assignment prohibited) | #6 | #7 | #8 | #9 |
|---|---|---|---|---|---|---|---|---|---|
| 00000000 | 52 | | 52 | | 26 | 52 | | 52 | |
| 00000001 | 52 | | 52 | | 26 | 52 | | 52 (HARQ retransmission) | |
| 00000010 | 52 | | 52 | | 26 | 52 (HARQ retransmission) | | 52 | |
| ⋮ | | | | | ⋮ | | | | |
| 00001111 | 52 (HARQ retransmission) | | 52 (HARQ retransmission) | | 26 | 52 (HARQ retransmission) | | 52 (HARQ retransmission) | |

FIG. 32

BASE STATION, TERMINAL, TRANSMISSION METHOD AND RECEPTION METHOD

TECHNICAL FIELD

The present disclosure relates to a base station, a terminal, a transmission method, and a reception method.

BACKGROUND ART

Topic Interest Group (TIG) and Study Group (SG) have been discussing the standardization of Extreme High Throughput (EHT) as the successor standard of the Institute of Electrical and Electronics Engineers (IEEE) 802.11ax (hereinafter, referred to as "11ax"), which is a standard of IEEE 802.11.

In EHT, the introduction of Hybrid Automatic Repeat Request (HARQ) has been discussed for the purpose of improving the link efficiency (e.g., see Non-Patent Literature (hereinafter, referred to as "NPL") 2).

CITATION LIST

Non-Patent Literatures

NPL 1
IEEE P802.11ax D3.0, June 2018
NPL 2
IEEE 802.11-18/2029r1, HARQ in EHT, Jan. 14, 2019

SUMMARY OF INVENTION

There has been, however, no sufficient discussion on HARQ retransmission control methods in radio communication, such as wireless local area network (WLAN), for example.

One non-limiting and exemplary embodiment facilitates providing a base station, a terminal, a transmission method and a reception method each capable of improving the efficiency of HARQ retransmission control.

A base station according to one embodiment of the present disclosure includes: control circuitry, which, in operation, generates common information and user specific information, the common information including information relating to retransmission control for each of a plurality of users and being common to the plurality of users, the user specific information being specific to each of the plurality of users and corresponding to the information relating to the retransmission control; and transmission circuitry, which, in operation, transmits a control signal including the common information and the user specific information.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to an exemplary embodiment of the present disclosure, the efficiency of HARQ retransmission can be improved.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 17A is a diagram illustrating an exemplary relationship between HARQ Types and additional subfields according to Method 1 of Embodiment 2;

FIG. 17B is a diagram illustrating an exemplary relationship between HARQ Types and additional subfields according to Method 1 of Embodiment 2;

FIG. 20 is a diagram illustrating an exemplary relationship between HARQ Types and additional subfields according to Method 2 of Embodiment 2;

FIG. 30 is a diagram illustrating an exemplary RU allocation information pattern according to Method 1 of Embodiment 3;

FIG. 31 is a diagram illustrating an exemplary RU allocation information pattern according to Method 2 of Embodiment 3;

FIG. 32 is a diagram illustrating an exemplary RU allocation information pattern according to Method 3 of Embodiment 3;

DESCRIPTION OF EMBODIMENTS

Hereinafter, embodiments of the present disclosure will be described in detail with reference to the accompanying drawings.

For example, 11ax supports Multi-User (MU) transmissions (e.g., see NPL 1). The MU transmissions include, for example, Downlink MU-Multiple Input Multiple Output (DL MU-MLMO) and DL Orthogonal Frequency Division Multiple Access (DL OFDMA).

In the case of DL MU-MIMO or DL OFDMA, an Access Point ((AP) or referred to as "base station") to indicates control information to each Station ((STA) or referred to as "terminal" or terminal), using a control signal of a Preamble (e.g., so called SIG-B or SIG-B field) included in Multiuser Physical layer Protocol Data Unit (MU PPDU), for example.

Further, in the case of Uplink MU-MIMO (UL MU-MIMO) or UL OFDMA, the AP indicates control information to a plurality of STAs in the coverage of the AP, using a control signal that prompts transmission of an UL OFDMA signal (hereinafter, the control signal will be referred to as a "Trigger frame" or trigger signal).

Figure 1:
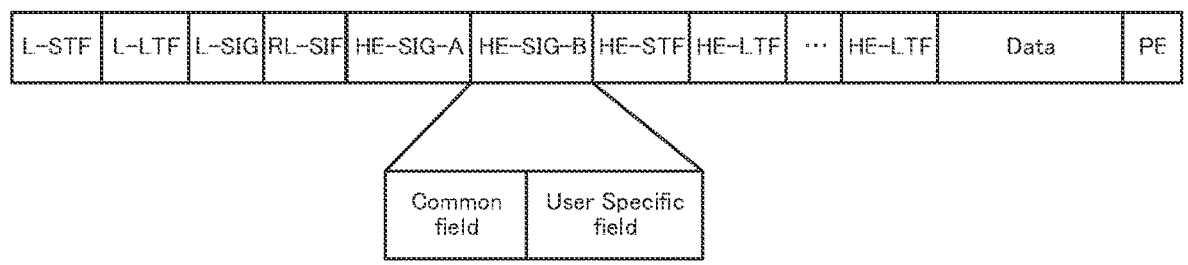
FIG. 1 is a diagram illustrating an exemplary SIG-B format.

FIG. 1 illustrates an exemplary configuration of an HE-SIG-B (hereinafter, referred to simply as "SIG-B") of High Efficiency MU PPDU(HE MU PPDU) (hereinafter, simply referred to as "MU PPDU") indicating a downlink MU transmission in 11ax.

As illustrated in FIG. 1, SIG-B includes "Common field" including information common to a plurality of users (i.e., STAs) (hereinafter, referred to as "common information"), and "User Specific field" including information for each user (hereinafter, referred to as "user information" or "user specific information"). In a Common field, for example, an RU allocated to each user and the number of multiplexed users are indicated in a Resource Unit (RU) Allocation subfield. Further, a User Specific field is configured with, for example, one or more User Block fields (not illustrated). Each User Block field is a field resulting from encoding a User field of one or more users with a Block Check Character (BCC). Further, the alignment sequence of User fields may correspond to the alignment sequence of users to which RUs are allocated in the RU Allocation subfield included in the Common field, for example.

Figure 2:
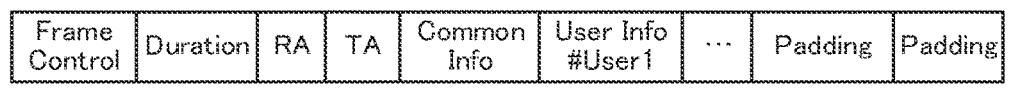
FIG. 2 is a diagram illustrating an exemplary Trigger frame format.

FIG. 2 illustrates an exemplary configuration of a Trigger frame indicating an uplink MU transmission in 11ax.

As illustrated in FIG. 2, Trigger frame, as with SIG-B, includes a "Common Info field" including common information and a "User Info field" including user information. For example, in SIG-B, the RU allocation information for all STAs is indicated in the RU Allocation subfield included in the Common field, whereas, in a Trigger frame, the RU allocation information for each STA is indicated in the RU Allocation subfield included in the User info field.

In EHT, the introduction of retransmission control (e.g., Hybrid Automatic Repeat Request (HARQ) of packets has been discussed (e.g., see NPL 2) for the purpose of improving the communication quality in cell edges or an environment where a channel fluctuation is large. Unlike retransmission control in the MAC layer, HARQ is a technique for enhancing gain by retransmitting physical layer packets (physical data channel) and combining the packets with the last packets on the receiving side.

For HARQ in EHT, two retransmission schemes including Chase Combine (CC) and Incremental Redundancy (IR) have been discussed. CC is a method for enhancing the reception quality (e.g., Signal-to-Noise Ratio (SNR)) via retransmission of a packet identical to an erroneous packet and maximum ratio combining. Further, IR is a method for enhancing the coding gain by transmitting an encoded sequence including different parity bits for each number of transmissions in accordance with a transmission start position (e.g., referred to as "Redundancy version (RV)") of an encoded sequence data saved in a circular buffer on the transmission side and combining on the receiving side (hereinafter, may be referred to as "HARQ combination").

There has been, however, no sufficient discussion on HARQ retransmission control methods in MU-transmission (e.g., MU-MIMO and OFDMA) in WLAN, such as EHT.

In this respect, in one non-limiting and exemplary embodiment of the present disclosure, a method for enhancing the efficiency of HARQ retransmission control in MU transmission will be described.

[Configuration of Radio Communication System]

A radio communication system according to an embodiment of the present disclosure includes at least one AP and a plurality of STAs.

For example, in DL communication e.g., transmission and reception of DL data), an AP (also referred to as "downlink radio transmission apparatus") transmits a DL signal for a plurality of STAs (also referred to as "downlink radio reception apparatuses") in downlink MU transmission. Each STA receives the DL signal addressed to the STA from the signals transmitted in the downlink MU transmission.

Further, for example, in UL communication (e.g., transmission and reception of UL data), a plurality of STAs (also referred to as "uplink radio transmission apparatuses") transmit a UL signal in uplink MU transmission. The AP (also referred to as "uplink radio reception apparatus") receives the UL signals transmitted from the plurality of STAs in the uplink MU transmission.

Embodiment 1

In Embodiment 1, for example, the user information included in a control signal (i.e., the format of control signal) indicated from an AP to STAs includes information on retransmission control of a data signal (e.g., referred to as HARQ information or HARQ control signal).

In other words, the field in which the user information is indicated includes a subfield in which HARQ information is indicated.

Hereinafter, as an example, a case will be described in which an HARQ control signal is included in the user information with a format of a control signal for MU transmission (e.g., SIG-B for DL transmission and Trigger frame for UL transmission) in 11ax as a basis.

Figure 3:
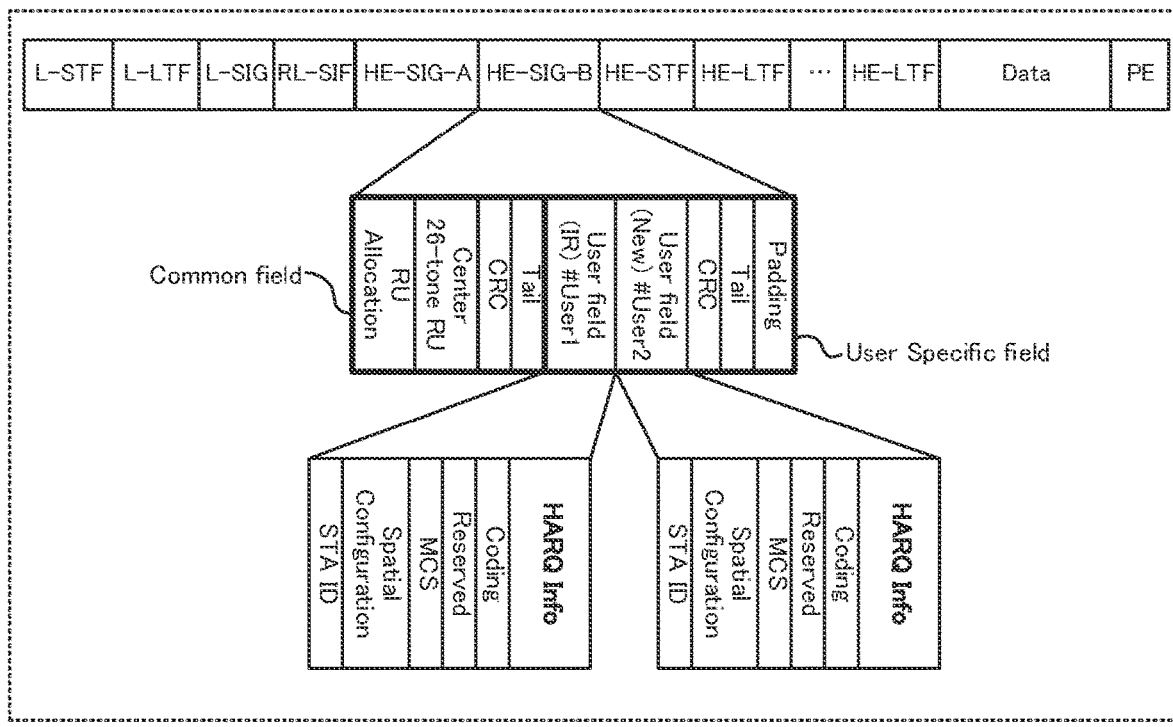
FIG. 3 is a diagram illustrating an exemplary SIG-B format according to Embodiment 1.

FIG. 3 illustrates an example in which HARQ information (HARQ Info subfield) is included in the user information (User Specific field) in SIG-B for downlink MU transmission.

Figure 4:
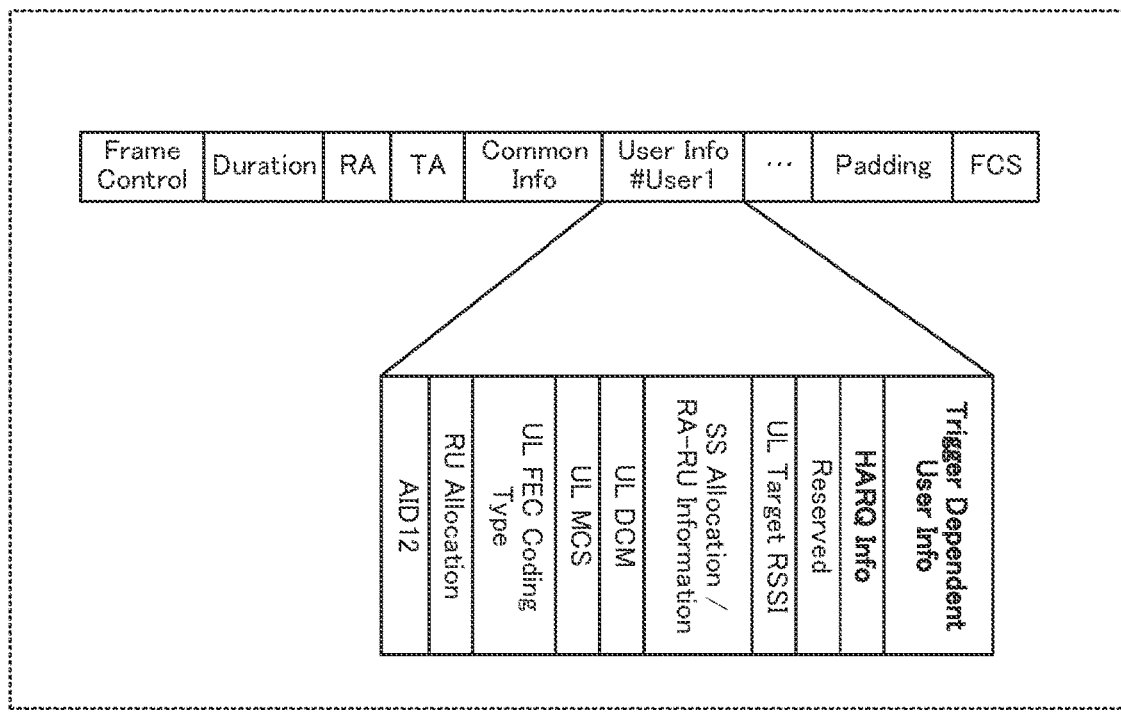
FIG. 4 is a diagram illustrating an exemplary Trigger frame format according to Embodiment 1.

Further, FIG. 4 illustrates an example in which HARQ information (HARQ Info subfield) is included in the user information (User Info field) in a Trigger frame for uplink MU transmission.

As illustrated in FIGS. 3 and 4, for example, HARQ information in a fixed size may be added to each user information regardless of the presence or absence of retransmission for each STA (i.e., either a new packet or a retransmission packet). In other words, in FIGS. 3 and 4, the configuration (e.g., such as sizes and Sub field types) of the user information (e.g., User specific field) is fixed as in 802.11ax.

Note that, the configuration of the user information illustrated in FIGS. 3 and 4 may have a variable length in accordance with the presence or absence of HARQ information.

In this case, the AP indicates, to the STA, control information indicating the configuration (e.g., size or Sub field type) of each user information.

Further, the STAs may blind decode (i.e., monitor) user information having a variable configuration in accordance with the presence or absence of HARQ information. In this case, indication of the control information indicating the configuration of the user information becomes unnecessary.

According to Embodiment 1, each STA can appropriately control retransmission control (e.g., transmission and reception of retransmission packets), using HARQ information included in the user information corresponding to the STA.

Embodiment 2

In Embodiment 1, as illustrated in FIGS. 3 and 4, when the configuration of the user information (User Specific field or User Info field) including HARQ information is fixed, the signaling amount of the user information (i.e., overhead) increases in proportion to the number of multiplexed users in MU transmission.

Further, in Embodiment 1, when the configuration of user information is variable in accordance with the presence or absence of HARQ information, the signaling amount increases as much as the control information indicating the configuration of the user information (e.g., size) is indicated from the AP to the STAs. In addition, when the user information is decoded blindly in the STA that is the receiving side without indicating the control information indicating the configuration of the user information, the decoding processing in the STA becomes complicated.

In this respect, in the present embodiment, a retransmission control method for reducing the overhead for HARQ information and enhancing the system efficiency will be described.

[Exemplary Configuration of Radio Communication System for DL Communication]

First, an exemplary configuration of a radio communication system for DL communication will be described. The radio communication system for DL communication includes, for example, downlink radio transmission apparatus 100 (e.g., AP) and downlink radio reception apparatus 200 (e.g., STA).

Downlink radio transmission apparatus 100 transmits, for example, a control signal (e.g., SIG-B) of a Preamble including common information and user information, and a DL data signal to be configured based on the control signal to downlink radio reception apparatus 200. Downlink radio reception apparatus 200 receives the control signal and DL data signal transmitted from downlink radio transmission apparatus 100. Note that, Preamble may be included in, for example, a physical data channel for MU transmission (e.g., MU PPDU).

Figure 5:
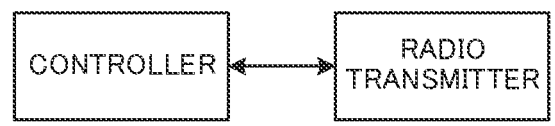
FIG. 5 is a block diagram illustrating an exemplary configuration of a part of a downlink radio transmission apparatus according to Embodiment 2.

FIG. 5 is a block diagram illustrating an exemplary configuration of a part of downlink radio transmission apparatus 100 according to an embodiment of the present disclosure. In downlink radio transmission apparatus 100 illustrated in FIG. 5, a controller generates common information (e.g., Common field information) common to a plurality of users including information related to retransmission control for each of the plurality of users (e.g., HARQ information), and User specific information e.g., User Specific field information) specific to each of the plurality of users according to the information related to retransmission control. A radio transmitter transmits a control signal (e.g., SIG-B) including the common information and the user specific information.

Figure 6:
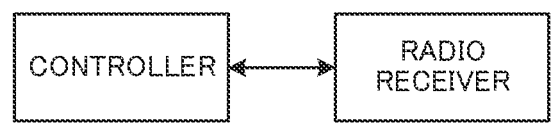
FIG. 6 is a block diagram illustrating an exemplary configuration of a part of a downlink radio reception apparatus according to Embodiment 2.

FIG. 6 is a block diagram illustrating an exemplary configuration of a part of downlink radio reception apparatus 200 according to an embodiment of the present disclosure. In downlink radio reception apparatus 200 illustrated in FIG. 6, a radio receiver receives a control signal (e.g., SIG-B) including common information (e.g., Common field information) common to a plurality of users and user specific information (e.g., User Specific field information) specific to each of the plurality of users. A controller may control retransmission of a data signal based on information relating to retransmission control for each of the plurality of users indicated in the common information (e.g., HARQ information), and user specific information corresponding to the information relating to retransmission control.

<Exemplary Configuration of Downlink Radio Transmission Apparatus 100>

Figure 7:
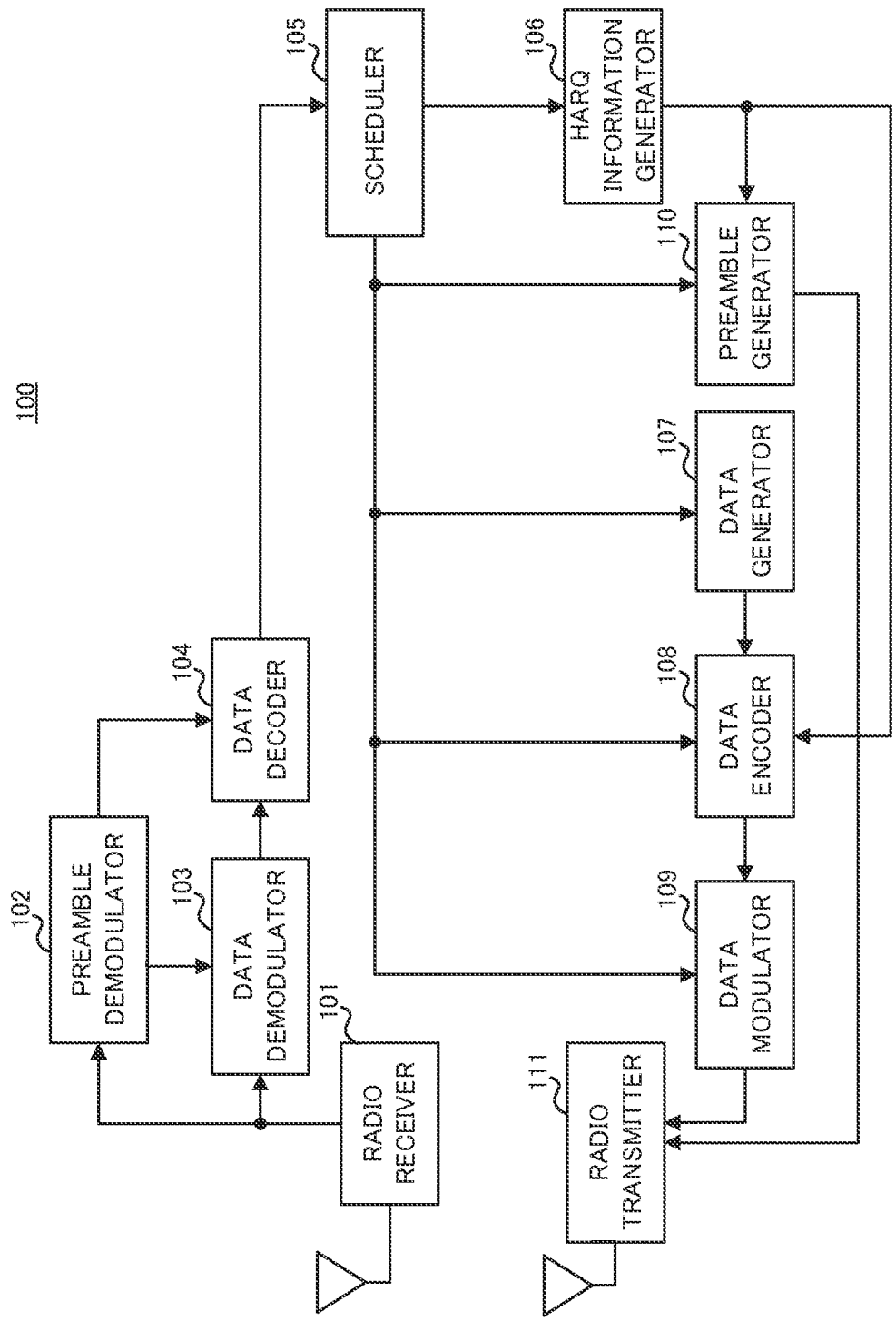
FIG. 7 is a block diagram illustrating an exemplary configuration of the downlink radio transmission apparatus according to Embodiment 2.

FIG. 7 is a block diagram illustrating an exemplary configuration of downlink radio transmission apparatus 100 (e.g., an AP). Downlink radio transmission apparatus 100 illustrated in FIG. 7 includes, for example, radio receiver 101, preamble demodulator 102, data demodulator 103 data decoder 104, scheduler 105, HARQ information generator 106, data generator 107, data encoder 108, data modulator 109, preamble generator 110, and radio transmitter 111.

The controller illustrated in FIG. 5, for example, may correspond to a processor relating to generation of a control signal in FIG. 7 (e.g., scheduler 105, HARQ information generator 106, and/or preamble generator 110). Further, the radio transmitter illustrated in FIG. 5, for example, may correspond to radio transmitter 111 illustrated in FIG. 7.

Radio receiver 101 receives a signal transmitted from downlink radio reception apparatus 200 (e.g., STA) via an antenna and performs radio reception processing, such as down-conversion, A/D conversion, and/or the like on the received signal. The signal transmitted from downlink radio reception apparatus 200 may include, for example, a preamble section (also referred to as a preamble signal) and a data section (also referred to as a data signal). The data section may include, for example, Acknowledgement (ACK)/Negative Acknowledgement (NACK), which is a response signal for DL data.

Radio receiver 101 extracts a preamble section from a received signal resulting from the radio reception processing and outputs the extracted preamble section to preamble demodulator 102. Further, radio receiver 101 extracts a data section from the received signal resulting from the radio reception processing and outputs the extracted data section to data demodulator 103.

Preamble demodulator 102 performs demodulation processing, such as Fourier transform (Fast Fourier Transform (FFT)), on the preamble section received from radio receiver 101, and extracts control information used for demodulation and decoding of the data included in the preamble section. The control information may include, for example, radio allocation resource information or Modulation and Coding Scheme (MCS) or the like. Preamble demodulator 102 outputs the extracted control information to data demodulator 103 and data decoder 104. Further, when performing channel estimation using a preamble, for example, preamble demodulator 102 may output a result of the channel estimation to data demodulator 103.

Data demodulator 103 performs processing, such as FFT, on the data section received from radio receiver 101, demodulates the data section, using the control information and the result of channel estimation received from preamble demodulator 102, and outputs the demodulated data signal to data decoder 104.

Data decoder 104 decodes the data signal received from data demodulator 103, using the control information received from preamble demodulator 102, and acquires an ACK/NACK signal (e.g., signal indicating either ACK or NACK) for each downlink radio reception apparatus 200. Data decoder 104 outputs the ACK/HACK signal to scheduler 105.

Scheduler 105 determines a type of HARQ (hereinafter, also referred to as "HARQ Type") for each downlink radio reception apparatus 200 based on, for example, the ACK/NACK signal of each downlink radio reception apparatus 200 received from data decoder 104. The HARQ type indicates, for example, whether a new packet or a retransmission packet is to be transmitted in the next transmission to downlink radio reception apparatus 200. In other words, the HARQ type indicates whether the transmission of the data signal is a new transmission or a retransmission. Further, the HARQ type may indicate an HARQ combining method (e.g., CC or IR) in transmission of a retransmission packet.

Further, scheduler 105 determines control information to be included in SIG-B, such as the number of transmission terminals for which DL data is multiplexed for transmission (i.e., the number of multiplexed users or the number of downlink radio reception apparatuses 200), a PHY Service Data Unit (PSDU) length of the DL data, encoding scheme, a frequency bandwidth, an MCS, or resource (e.g., RU) allocation to each downlink radio reception apparatus 200. Scheduler 105 outputs scheduling information indicating a scheduling result to HARQ information generator 106, data generator 107, data encoder 108, data modulator 109, and preamble generator 110.

HARQ information generator 106 generates HARQ information based on, for example, HARQ type, RU allocation information or the number of retransmissions of packets for each downlink radio reception apparatus 200 in the scheduling information received from scheduler 105. The HARQ information may include, for example, at least one of New Data Indicator (NDI) and RV. HARQ information generator 106 outputs the generated HARQ information to data encoder 108 and preamble generator 110.

Note that, when HARQ information includes an HARQ combining method (either CC or IR), the configuration of HARQ combining method may be determined based on, for example, information indicating the capability of downlink radio reception apparatus 200 (hereinafter, referred to as "capability information"). The capability information of downlink radio reception apparatus 200 may be transmitted to downlink radio transmission apparatus 100 (e.g., AP) from downlink radio reception apparatus 200 during the initial connection to downlink radio transmission apparatus 100. Further, the capability information may include information indicating an HARQ combining method supported by this downlink radio reception apparatus 200 (e.g., supporting both CC and R, supporting CC but not supporting IR), for example.

Data generator 107 generates a data sequence (i.e., DL data) addressed to the applicable downlink radio reception apparatus 200 based on the scheduling information (e.g., information indicating a packet length and/or the like) received from scheduler 105, and outputs the generated data sequence to data encoder 108.

Data encoder 108 encodes the data sequence received from data generator 107, using the scheduling information (e.g., encoding method or MCS) received from scheduler 105 and holds the encoded data. When IR is used, for example, data encoder 108 extracts the encoded data corresponding to the HARQ information (e.g., RV) received from HARQ information generator 106 from the held encoded data, for example, and outputs the extracted encoded data to data modulator 109. Further, when CC is used, for example, data encoder 108 extracts the encoded data corresponding to the HARQ information (e.g., set value for RV (e.g., RV=0) received from HARQ information generator 106 from the held encoded data, and outputs the extracted encoded data to data modulator 109.

Data modulator 109, for example, modulates the encoded data received from data encoder 108, using the scheduling information received from scheduler 105 (e.g., MCS), and outputs the modulated signal to radio transmitter 111. For the modulation of encoded data, for example, a modulation scheme, such as Quadrature Amplitude Modulation (QAM) may be used. Further, data modulator 109 assigns the modulated signal to a radio resource based on scheduling information (e.g., RU allocation information), performs inverse Fast Fourier transform (IFFT) processing to generate an OFDM signal, and outputs the OFDM signal to radio transmitter 111, for example.

Preamble generator 110 generates a preamble signal based on the scheduling information (e.g., such as the number of transmission terminals or transmission band information) received from scheduler 105, and the HARQ information received from HARQ information generator 106, and outputs the generated preamble signal to radio transmitter 111.

The preamble signal may be formed of, for example, control information including RU allocation information, and reference information.

Radio transmitter 111 time-multiplexes the data section (e.g., OFDM signal) received from data modulator 109 and the preamble section received from preamble generator 110. Radio transmitter 111 performs radio transmission processing, such as D/A conversion, up-conversion to carrier frequency, and/or the like on the time-multiplexed signal, and transmits the signal resulting from the radio transmission processing to downlink radio reception apparatus 200 via an antenna.

<Exemplary Configuration of Downlink Radio Reception Apparatus 200>

Figure 8:
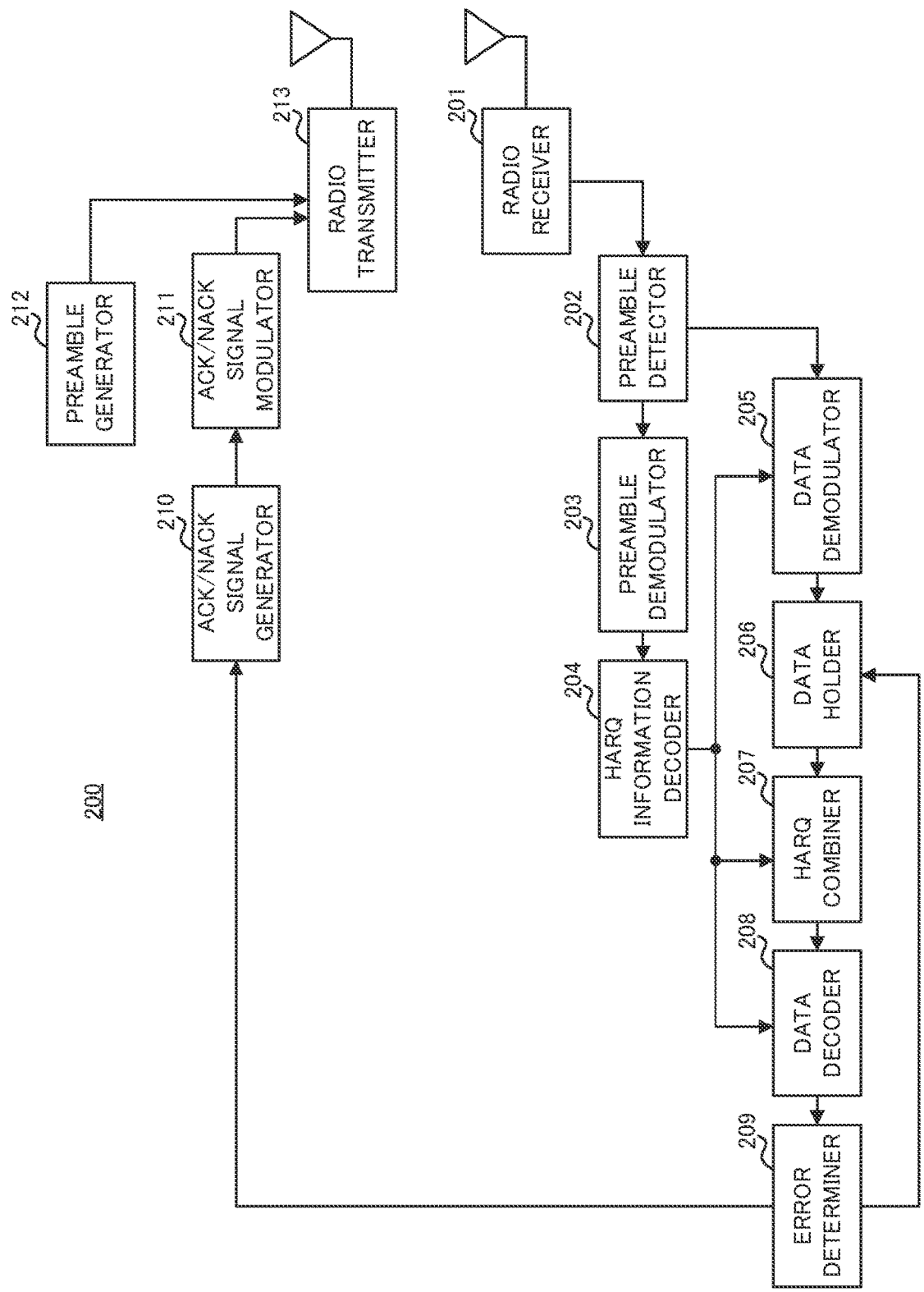
FIG. 8 is a block diagram illustrating an exemplary configuration of the downlink radio reception apparatus according to Embodiment 2.

FIG. 8 is a block diagram illustrating an exemplary configuration of downlink radio reception apparatus 200 (e.g., STA). Downlink radio reception apparatus 200 illustrated in FIG. 8 includes, for example, radio receiver 201, preamble detector 202, preamble demodulator 203, HARQ information decoder 204, data demodulator 205, data holder 206, HARQ combiner 207, data decoder 208, error determiner 209, ACK/NACK signal generator 210, ACK/NACK signal modulator 211, preamble generator 212, and radio transmitter 213.

The radio receiver illustrated in FIG. 6, for example, may correspond to radio receiver 201 illustrated in FIG. 8. Further, the controller illustrated in FIG. 6 may correspond to a processor relating to reception of a control signal (e.g., SIG-B) (e.g., preamble detector 202, preamble demodulator 203 or HARQ information decoder 204) in FIG. 8.

Radio receiver 201 performs radio reception processing, such as down-conversion, AD conversion and/or the like on a signal received via the antenna, and outputs a signal resulting from the radio reception processing to preamble detector 202.

Preamble detector 202 performs, for example, correlation detection or power detection on the received signal received from radio receiver 201 to detect a preamble signal (i.e., reception determination). In a case where preamble detector 202 detects a preamble signal, for example, preamble detector 202 outputs the preamble section included in the received signal to preamble demodulator 203 and outputs the data section included in the received signal to data demodulator 205. Meanwhile, in a case where preamble detector 202 detects no preamble signal, preamble detector 202 may cancel the subsequent reception processing.

Preamble demodulator 203 performs demodulation processing, such as FFT, on the preamble section of the received signal received from preamble detector 202 and outputs the demodulated preamble signal to HARQ information decoder 204.

HARQ information decoder 204 decodes the HARQ information, using the preamble signal received from preamble demodulator 203. Note that, the decoding processing for the HARQ information may be performed in accordance with a configured preamble format. HARQ information decoder 204 outputs the decoded HARQ information to data demodulator 205, HARQ combiner 207, and data decoder 208.

Data demodulator 205 performs FFT processing on the data signal (e.g., data section) received from preamble detector 202 and extracts data (DL data) addressed to downlink radio reception apparatus 200, using the HARQ information (e.g., RU allocation information) received from HARQ information decoder 204. Data demodulator 205 performs channel equalization and demodulation (e.g., QAM demodulation) on the extracted data, and outputs the demodulated data signal to data holder 206.

Data holder 206 saves the data signal received from data demodulator 205 in a buffer and outputs the data signal to HARQ combiner 207. When error determiner 209 determines that there is no error in the decoded data, data holder 206 deletes the saved data signal from the buffer. When error determiner 209 determines that there is an error in the decoded data, data holder 206 holds the data until the number of retransmissions of the data exceeds a predetermined number of retransmissions (i.e., the maximum number of retransmissions).

HARQ combiner 207 determines whether or not to perform HARQ combining on the received data received from data holder 206, based on the HARQ information (e.g., HARQ Type, RV, or NDI) received from HARQ information decoder 204. When the received data is a new packet, for example, HARQ combiner 207 outputs the received data to data decoder 208 without performing HARQ combining. When the received data is a retransmission packet, for example, HARQ combiner 207 searches for and extracts the saved data prior to retransmission from the buffer, performs HARQ combining of the saved data and the received data in accordance with an indicated RV, for example, and outputs the data resulting from the combining to data decoder 208.

Data decoder 208 decodes the data received from HARQ combiner 207, using, the HARQ information (e.g., an encoding method or MCS) received from HARQ information decoder 204, and outputs the decoded data to error determiner 209.

Error determiner 209 performs error detection on the data received from data decoder 208 (i.e., resultant of decoding the data), using a Cyclic Redundancy Check (CRC) and/or the like. When there is no error, error determiner 209 outputs information indicating that there is no error to data holder 206 and outputs information indicating an ACK request to ACK/NACK signal generator 210. When there is an error, error determiner 209 outputs information indicating the presence of an error and outputs information indicating a NACK request to ACK/NACK signal generator 210.

ACK/NACK signal generator 210 generates an ACK/NACK signal (signal indicating either ACK or NACK) based on information (e.g., ACK request or NACK request) received from error determiner 209 and outputs the generated. ACK/NACK signal to ACK/NACK signal modulator 211. When generating a NACK, ACK/NACK signal generator 210 may include a signal requesting transmission of a retransmission packet (e.g., HARQ retransmission signal) in the ACK/NACK.

ACK/NACK signal modulator 211 performs a processing, such as IFFT processing or modulation (e.g., QAM modulation) on the ACK/NACK signal received from ACK/NACK signal generator 210 and outputs the modulated signal (e.g., referred to as data signal) to radio transmitter 213.

Preamble generator 212 generates a preamble signal to be used for packets including an ACK/NACK signal and outputs the preamble signal to radio transmitter 213.

Radio transmitter 213 time-multiplexes the preamble signal (or referred to as preamble section) received from preamble generator 212 and the data signal (or referred to as data section) received from ACK/HACK signal modulator 211. Radio transmitter 213 performs radio transmission processing, such as D/A conversion, up-conversion to a carrier frequency, and/or the like on the time-multiplexed signal, and transmits a signal resulting from the radio transmission processing to downlink radio transmission apparatus 100 via an antenna.

[Exemplary Configuration of Radio Communication System Configuration for UL Communication]

Next, a description will be given of an exemplary configuration of a radio communication system for UL communication. The radio communication system for UL communication includes, for example, uplink radio transmission apparatus 300 (e.g., STA) and uplink radio reception apparatus 400 (e.g., AP).

Uplink radio transmission apparatus 300 transmits a UL data signal to uplink radio reception apparatus 400 based on, for example, a control signal (e.g., Trigger frame) of a preamble including the common information and the user information transmitted by uplink radio reception apparatus 400. Uplink radio reception apparatus 400 receives the UL data signal transmitted from uplink radio transmission apparatus 300. Note that, the UL data may be included, for example, in a physical channel (e.g., Trigger-based (TB) PPDU) for multi-user transmission.

Figure 9:
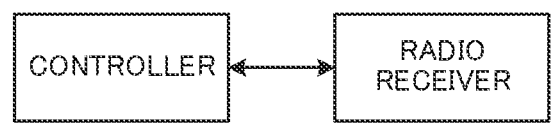
FIG. 9 is a block diagram illustrating an exemplary configuration of a part of an uplink radio transmission apparatus according to Embodiment 2.

FIG. 9 is a block diagram illustrating an exemplary configuration of a part of uplink radio transmission apparatus 300 according to an embodiment of the present disclosure. In uplink radio transmission apparatus 300 illustrated in FIG. 9, a radio receiver receives a control signal (e.g., Trigger frame) including common information (e.g., Common info field information) common to a plurality of users and user specific information (e.g., User Info field information) specific each of the plurality of users. The controller may control retransmission of the data signal based on information relating to retransmission control (e.g., HARQ information) for each of the plurality of users indicated in the common information, and user specific information corresponding to the information relating to retransmission control.

Figure 10:
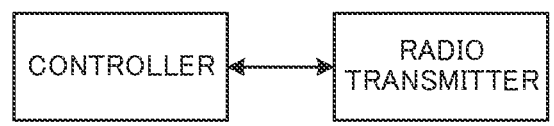
FIG. 10 is a block diagram illustrating an exemplary configuration of a part of an unlink radio reception apparatus according to Embodiment 2.

FIG. 10 is a block diagram illustrating a configuration example of a part of uplink radio reception apparatus 400 according to an embodiment of the present disclosure. In uplink radio reception apparatus 400 illustrated in FIG. 10, a controller generates common information common to a plurality of users (e.g., Common Info field information) including information relating to retransmission control for each of the plurality of users (e.g., HARQ information) and user specific information (e.g., User Info field information) for each of the plurality of users in accordance with the information relating to retransmission control. The radio transmitter transmits a control (e.g., Trigger frame) signal including the common information and user specific information.

<Exemplary Configuration of Uplink Radio Transmission Apparatus 300>

Figure 11:
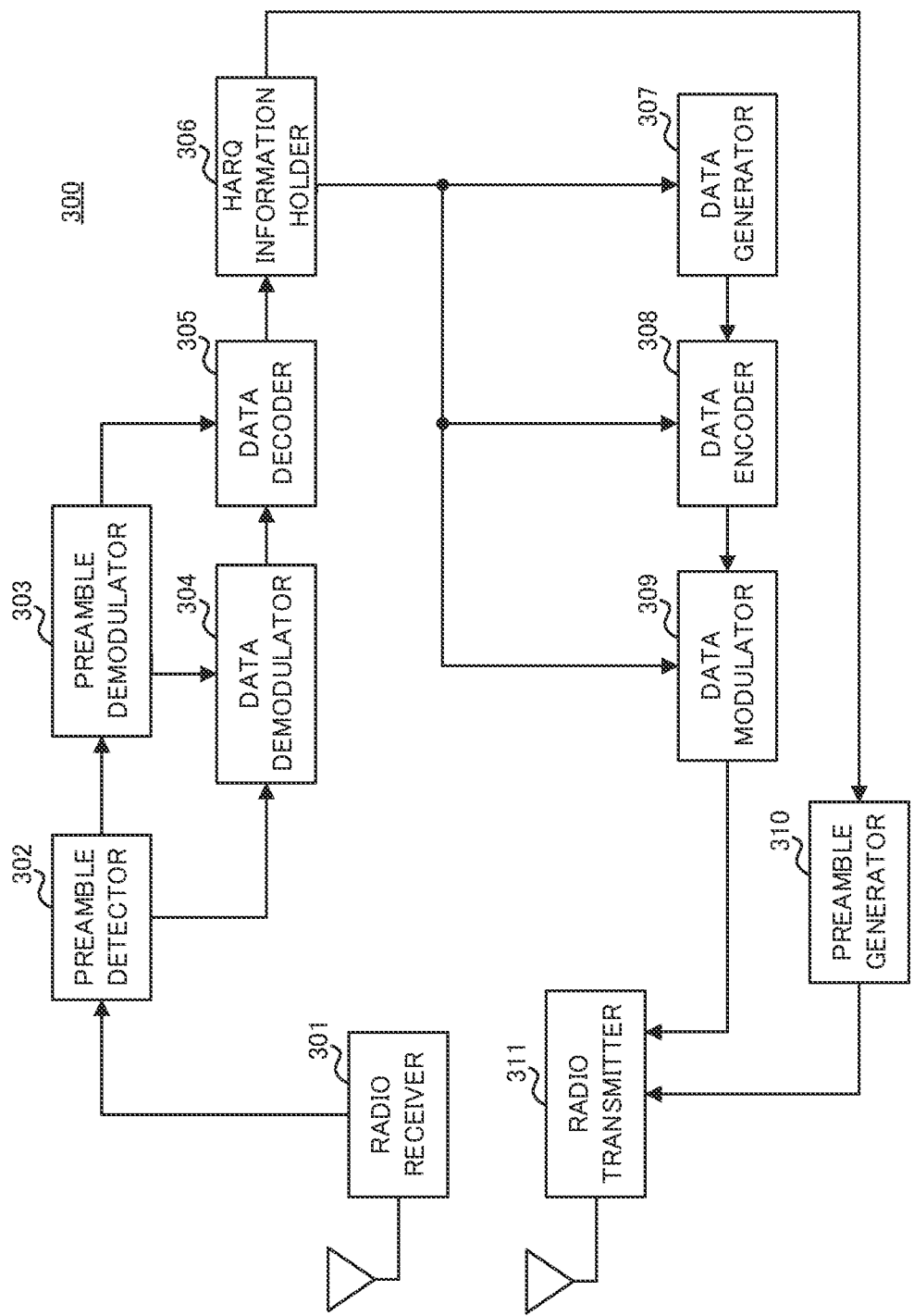
FIG. 11 is a block diagram illustrating an exemplary configuration of the uplink radio transmission apparatus according to Embodiment 2.

FIG. 11 is a block diagram illustrating an exemplary configuration of uplink radio transmission apparatus 300 (e.g., STA). Uplink radio transmission apparatus 300 illustrated in FIG. 11 includes, for example, radio receiver 301, preamble detector 302, preamble demodulator 303, data demodulator 304, data decoder 305, HARQ information holder 306, data generator 307, data encoder 308, data modulator 309, preamble generator 310, and radio transmitter 311.

The radio receiver illustrated in FIG. 9, for example, may correspond to radio receiver 301 illustrated in FIG. 11, for example. Further, the controller illustrated in FIG. 9, for example, may correspond to a processor relating to retransmission control of the data signal in FIG. 11 (e.g., HARQ information holder 306, data generator 307, data encoder 308, data modulator 309, and preamble generator 310).

Radio receiver 301 receives a signal transmitted from uplink radio reception apparatus 400 (e.g., AP) via an antenna, performs radio reception processing, such as down-conversion, A/D conversion, and/or the like on the received signal, and outputs the signal resulting from the radio reception processing to preamble detector 302.

Preamble detector 302 performs, for example, correlation detection or power detection on the received signal received from radio receiver 301 to detect a preamble signal (i.e., reception determination). When the preamble signal is detected, for example, preamble detector 302 outputs a preamble section included in the received signal to preamble demodulator 303, and outputs a data section (e.g., including Trigger frame) included in the received signal to data demodulator 304. Meanwhile, when detecting no preamble signal, preamble detector 302 may cancel the subsequent reception processing.

Preamble demodulator 303 performs demodulation processing, such as FFT on the preamble section of the received signal received from preamble detector 302, and outputs the demodulated preamble signal to data demodulator 304 and data decoder 305. Further, when performing channel estimation using the preamble signal, preamble demodulator 303 may also output a result of the channel estimation to data demodulator 304, for example.

Data demodulator 304 demodulates the data signal (e.g., data section) received from preamble detector 302, using the control information and the result of channel estimation included in the preamble signal outputted from preamble demodulator 303, extracts the received data including a Trigger frame, for example, and outputs the received data to data decoder 305.

Data decoder 305 decodes the received data received from data demodulator 304, using the control information included in the preamble signal received from preamble demodulator 303, and outputs the decoded signal to HARQ information bolder 306.

HARQ information bolder 306 outputs the common information in the Trigger frame included in the signal received from data decoder 305 and the control information relating to transmission of UL data included in the user information to data generator 307, data encoder 308, data modulator 309, and preamble generator 310. Note that, the control information relating to the transmission of UL data may be, for example, information relating to transmission of HE TB PDCU (hereinafter, referred to as TB PPDU), which is an uplink multi-user transmission format of 11ax, for example.

Further, HARQ information holder 306 saves the control information included in the Trigger frame in a buffer. When HARQ retransmission is indicated using HARQ information included in the Trigger frame, for example, HARQ information holder 306 may output the control information at the last transmission saved in the buffer to data generator 307, data encoder 308, data modulator 309, and preamble generator 310.

Data generator 307 generates a data sequence (i.e., UL data) based on control information (e.g., information indicating a packet length) received from HARQ information holder 306 and outputs the generated data sequence to data encoder 308.

Data encoder 308 encodes the data sequence received from data generator 307, using control information (e.g., encoding method or MCS) received from HARQ information holder 306, and holds the encoded data. When IR is used, for example, data encoder 308 extracts the encoded data corresponding to the control information (e.g., RV) received from HARQ information holder 306, from the held encoded data, for example, and outputs the extracted encoded data to data modulator 309. When CC is used, for example, data encoder 308 extracts the encoded data corresponding to the control information (e.g., set value of RV (e.g., RV=0)) received from HARQ information holder 306 from the held encoded data, and outputs the extracted encoded data to data modulator 309.

Data modulator 309, for example, modulates the encoded data received from data encoder 308, using the control information (e.g., MCS) received from HARQ information holder 306, and outputs the modulated signal to radio transmitter 311. Further, data modulator 309, for example, assigns the modulated signal to a radio resource and performs an IFFT processing based on the control information (e.g., RU allocation information) received from HARQ information holder 306 to generate an OFDM signal, and may output the OFDM signal to radio transmitter 311.

Preamble generator 310 generates a preamble signal based on the control information received from HARQ information holder 306 and outputs the generated preamble signal to radio transmitter 311.

Radio transmitter 311 time-multiplexes the signal (e.g., data section) received from data modulator 309 and the preamble signal (e.g., preamble section) received from preamble generator 310. Radio transmitter 311 performs radio transmission processing, such as D/A conversion, up-conversion to a carrier frequency, and/or the like on the time-multiplexed signal, and transmits the signal resulting from the radio transmission processing to uplink radio reception apparatus 400.

<Exemplary Configuration of Uplink Radio Reception Apparatus 400>

Figure 12:
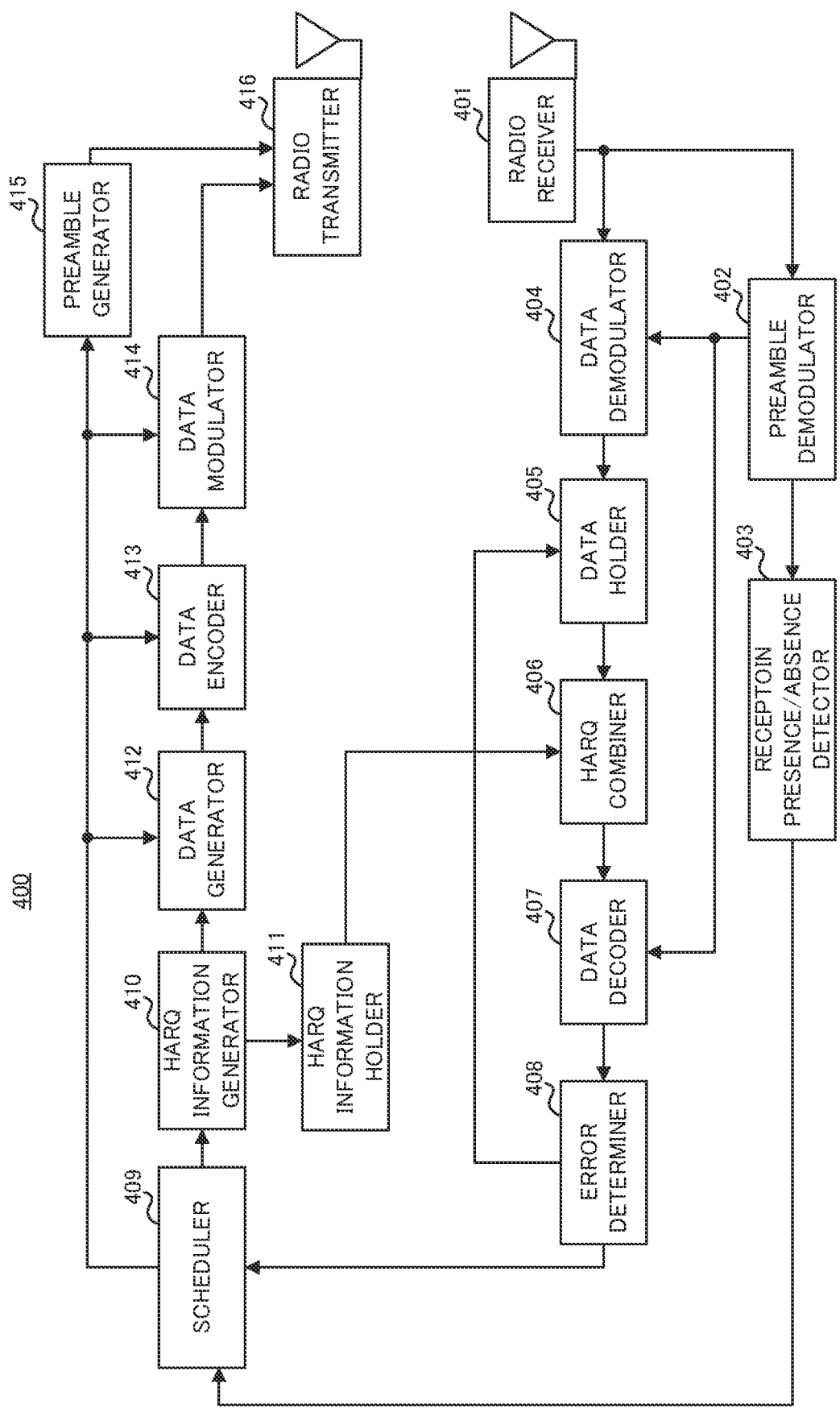
FIG. 12 is a block diagram illustrating an exemplary configuration of the unlink radio reception apparatus according to Embodiment 2.

FIG. 12 is a block diagram illustrating an exemplary configuration of uplink radio reception apparatus 400 (e.g., AP). Uplink radio reception apparatus 400 illustrated in FIG. 12 includes radio receiver 401, preamble demodulator 402, reception presence/absence detector 403, data demodulator 404, data holder 405, HARQ combiner 406, data decoder 407, error determiner 408, scheduler 409, HARQ information generator 410, HARQ information holder 411, data generator 412, data encoder 413, data modulator 414, preamble generator 415, and radio transmitter 416, for example.

The controller illustrated in FIG. 10, for example, may correspond to a processor relating to generation of a control signal in FIG. 12 (e.g., Trigger frame) (e.g., scheduler 409, HARQ information generator 410, HARQ information holder 411, data generator 412, data encoder 413, or data modulator 414). Further, the radio transmitter illustrated in FIG. 10 may correspond to radio transmitter 416 illustrated in FIG. 12.

Radio receiver 401 receives a signal transmitted from uplink radio transmission apparatus 300 via an antenna, performs radio reception processing, such as down-conversion, A/D conversion and/or the like on the received signal, and outputs the signal resulting from the radio reception processing to preamble demodulator 402 and data demodulator 404.

Preamble demodulator 402 performs demodulation processing, such as FFT, on a preamble section of the received signal received from radio receiver 401, and extracts control information used for demodulation and decoding of the data included in the preamble section. Preamble demodulator 402 outputs the extracted control information to data demodulator 404, data decoder 407, and reception presence/absence detector 403. When performing channel estimation using a preamble, for example, preamble demodulator 402 may output a result of the channel estimation to data demodulator 404.

Reception presence/absence detector 403 determines from which uplink radio transmission apparatus 300, the signal received by radio receiver 401 has been transmitted during a certain period of time after transmission of a control signal (e.g., Trigger frame) by uplink radio reception apparatus 400, for example. In other words, reception presence/absence detector 403 detects the presence or absence of reception of a signal transmitted from uplink radio transmission apparatus 300 during a certain period of time after transmission of the control signal to uplink radio reception apparatus 300. Reception presence/absence detector 403 determines the presence/absence of reception of a TB PPDU signal transmitted from each of uplink radio transmission apparatuses 300, which are the transmission destinations of a Trigger frame, based on the identification information (e.g., terminal IDs) included in the control information received from preamble demodulator 402, and outputs a result of the determination to scheduler 409, for example.

Data demodulator 404 extracts a data signal (e.g., UL data) of each of uplink radio transmission apparatuses 300 from the received signal received from radio receiver 401, using the control information and a result of the channel estimation received from preamble demodulator 402, and outputs the data signal to data holder 405.

Data holder 405 saves the data signal received from data demodulator 404 in a buffer and outputs the data signal to HARQ combiner 406. When error determiner 408 determines that there is no error in the decoded data, data holder 405 deletes the saved data signal from the buffer. When error determiner 408 determines that there is an error in the decoded data, data holder 405 holds the data until the number of retransmissions of the data exceeds a predetermined number of times (i.e., the maximum number of retransmissions).

HARQ combiner 406 determines whether or not to perform HARQ combining on the received data received from data holder 405, based on the HARQ information (e.g., HARQ Type, RV, or NDI) received from HARQ information holder 411. When the received data is new packets, for example, HARQ combiner 406 outputs the received data to data decoder 407 without performing HARQ combining. When the received data is retransmission packets, for example, HARQ combiner 406 searches for and extracts the saved data at the last transmission from the buffer, and performs HARQ combining of the saved data and retransmission data based on, for example, a combining method (e.g., CC or IR) indicated by the HARQ information (e.g., HARQ Type). HARQ combiner 406 outputs the combined data to data decoder 407.

Data decoder 407 decodes the data received from HARQ combiner 406, using the control information received from preamble demodulator 402, and outputs the decoded data to error determiner 408.

Error determiner 408 performs error detection on the data received from data decoder 407 (i.e., resultant of decoding the data), using CRC or the like. Error determiner 408 outputs information indicating no error to data holder 405 when there is no error, and outputs information indicating the presence of an error to data holder 405 when there is an error. Further, error determiner 408 outputs a result of the error determination to scheduler 409.

Scheduler 409 determines an HARQ type (e.g., information indicating whether it is transmission of a new packet or a retransmission packet) in the next MU transmission for each of uplink radio transmission apparatuses 300 based on the result of error determination of the received data, received from error determiner 408, and the information relating to the presence or absence of the transmission signal from each of uplink radio transmission apparatuses 300, received from reception presence/absence detector 403.

In addition, scheduler 409 determines control information to be included in a Trigger frame, such as the number of transmission terminals for multiplexing transmission of UL data (i.e., the number of multiplexed users or the number of uplink radio transmission apparatuses 300), a PSDU length of UL data, an encoding method, a frequency band width, an MCS, and/or RU allocation. Scheduler 409 outputs the determined control information (or referred to as scheduling information) to HARQ information generator 410, data generator 412, data encoder 413, data modulator 414, and preamble generator 415.

HARQ information generator 410 generates HARQ information based on, for example, an HARQ type of packets of each uplink radio transmission apparatus 300, RU allocation information, or the n tuber of retransmissions in the scheduling information received from scheduler 409. The HARQ information may include, for example, at least one of NDI and RV. HARQ information generator 410 outputs the generated HARQ information to data generator 412 and HARQ information holder 411.

Note that, when HARQ information includes an HARQ combining method (one of CC and IR), the configuration of HARQ combining method may be determined based on the capability information of uplink radio transmission apparatus 300, for example. The capability information of uplink radio transmission apparatus 300 may be transmitted to uplink radio reception apparatus 400 (e.g., AP) from uplink radio transmission apparatus 300 during the initial connection to uplink radio reception apparatus 400, Further, the capability information may include information indicating an HARQ combining method supported by uplink radio transmission apparatus 300 (e.g., supporting both CC and IR or supporting CC but not supporting IR), for example.

HARQ information holder 411 saves the HARQ information received from HARQ information generator 410 in a buffer. When HARQ retransmission is indicated using HARQ information included in a Trigger frame, for example, HARQ information holder 411 outputs the control information saved in the buffer to HARQ combiner 406.

Data generator 412 generates a data sequence (e.g., including Trigger frame), using the HARQ information received from HARQ information generator 410 or the scheduling information received from scheduler 409, and outputs the generated data sequence to data encoder 413.

Data encoder 413 encodes the data sequence received from data generator 412 based on the scheduling information (e.g., encoding method or MCS) received from scheduler 409, and outputs the encoded data to data modulator 414.

Data modulator 414 modulates the encoded data received from data encoder 413, using the scheduling information (e.g., MCS) received from scheduler 409, and outputs the modulated signal to radio transmitter 416. Further, data modulator 414 may assign the modulated signal to a radio resource based on the scheduling information (e.g., frequency bandwidth or RU allocation information), perform IFFT processing to generate an OFDM signal, and output the OFDM signal to radio transmitter 416, for example.

Preamble generator 415 generates a preamble signal based on the scheduling information received from scheduler 409 and outputs the generated preamble signal to radio transmitter 416.

Radio transmitter 416 combines the data section (e.g., including Trigger frame) received from data modulator 414 and the preamble section received from preamble generator 415. Radio transmitter 416 performs radio transmission processing, such as D/A conversion, up-conversion to a carrier frequency, and/or the like on the combined signal, and transmits the signal resulting from the radio transmission processing to uplink radio transmission apparatus 300 via an antenna.

[Operation Examples of AP and STA]

Next, a description will be given of operation examples of an AP (e.g., downlink radio transmission apparatus 100 or uplink radio reception apparatus 400) and an STA (e.g., downlink radio reception apparatus 200 or uplink radio transmission apparatus 300) according to the present embodiment.

A control signal (e.g., SIG-B or Trigger frame) indicating MU transmission includes, for example, common information which is information common to each user (i.e., STA) and user information which is information for each user (STA).

In the present embodiment, for example, in the control information indicating MU transmission, at least the common information includes HARQ information which is information relating to retransmission control of a data signal. The HARQ information included in the common information is, for example, an HARQ Type indicating the type of transmission packet (e.g., whether the transmission of the data signal is a new transmission or a retransmission for each of a plurality of users). Note that, the HARQ Type may include information indicating the type of retransmission control or indicating an HARQ combining method (e.g., either CC or IR).

Figure 13:
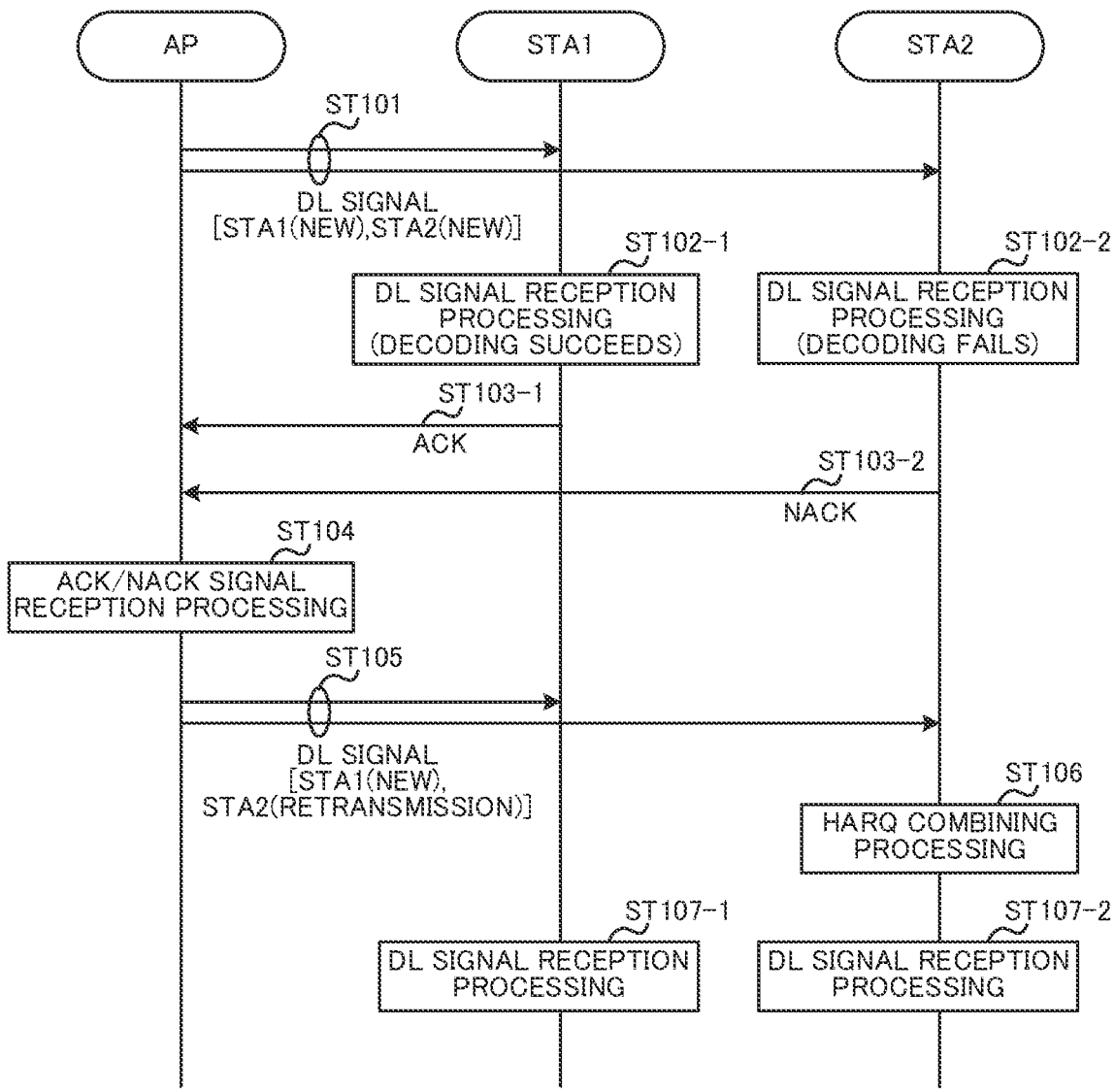
FIG. 13 is a sequence diagram illustrating an exemplary operation of a radio communication system related to downlink radio communication according to Embodiment 2.

FIG. 13 is a sequence diagram illustrating an operation example of a radio communication system for DL communication. In FIG. 13, an operation example of MU transmission among an AP (downlink radio transmission apparatus 100) and two STAs (i.e., STA1 and STA2 (downlink radio reception apparatuses 200)) will be described. Note that, the number of users (i.e., the number of STAs) to be multiplexed in MU transmission is not limited to two and may be three or more.

In FIG. 13, the AP transmits a DL signal (e.g., including preamble section and data section) in DL MU transmission (e.g., MU-MIMO transmission or OFDMA transmission) to STA1 and STA2 (ST 101). In FIG. 13, the type (e.g., HARQ Type) of transmission packet (e.g., data section) transmitted to STA1 and STA2 is a new packet. Further, in a control signal (e.g., SIG-B) indicating the DL MU transmission of a preamble section, the HARQ Type is included in the common information (e.g., Common field). Thus, the AP controls transmission of the DL signal based on the control signal (e.g., SIG-B) indicating the DL MU transmission.

STA1 and STA2 perform reception processing of the DL signal (ST 102-1 and ST 102-2). STA1 and STA2, for example, determine whether the packet indicated in the user information corresponding to each STA is a new packet or a retransmission packet (i.e., HARQ Type), based on HARQ information (e.g., HARQ Type) included in the common information in the control signal indicating DL MU transmission and included in the DL signal STA1 and STA2 perform the reception processing (e.g., demodulation, decoding, and error detection processing) of the DL data based on parameters included in the user information of a configuration (i.e., format) corresponding to the determined HARQ Type. In the manner described above, each STA controls reception of a DL signal based on the control signal (e.g., SIG-B) indicating DL MU transmission.

Note that, in FIG. 13, as a result of error detection, there is no error in the DL data in STA1 (i.e., decoding succeeds), and there is an error in the DL data in STA2 (i.e., decoding fails).

Since there is no error in the DL data, STA1 transmits an ACK/NACK signal including ACK to the AP (ST103-1). Further, since there is an error in the DL data, STA2 transmits an ACK/NACK signal including NACK to the AP (ST103-2). STA2 also saves the DL data (packet data) before decoding in a buffer.

Note that, each STA may determine not to transmit a signal to the AP in a case where the preamble section of the DL signal (DL MU signal) cannot be correctly decoded due to a collision of packets or degradation of a channel state, for example.

The AP receives an ACK/NACK signal transmitted from each STA (ST104).

The AP transmits, in DU MU transmission, a DL signal including a new packet for STA1 that has transmitted ACK and a retransmission packet for STA2 that has transmitted NACK (ST105), The AP may transmit the DL signal using HARQ information in the same format as that for the last transmission (e.g., ST101), for example, STA1 and STA2 perform the reception processing on the DL signal (ST106, ST107-1 and ST107-2) in the same manner as in the last transmission (e.g., ST101). STA1 and STA2 determine whether the packet indicated in the user information corresponding to each STA is a new packet or a retransmission packet (i.e., HARQ Type) based on HARQ information (e.g., HARQ Type) included in the common information in the control signal indicating DL MU transmission included in the DL signal, for example.

In FIG. 13, since transmission of a new packet is indicated in the common information, STA1 performs the reception processing on the DL data based on parameters included in the user information of the configuration corresponding to the new transmission (ST107-1).

Meanwhile, in FIG. 13, STA2 performs HARQ combining of the received retransmission packet and the saved packet (ST106) since the transmission of a retransmission packet is indicated in the common information. STA2 then performs the reception processing on the combined DL data based on parameters included in the user information of the configuration corresponding to retransmission (ST107-2).

Figure 14:
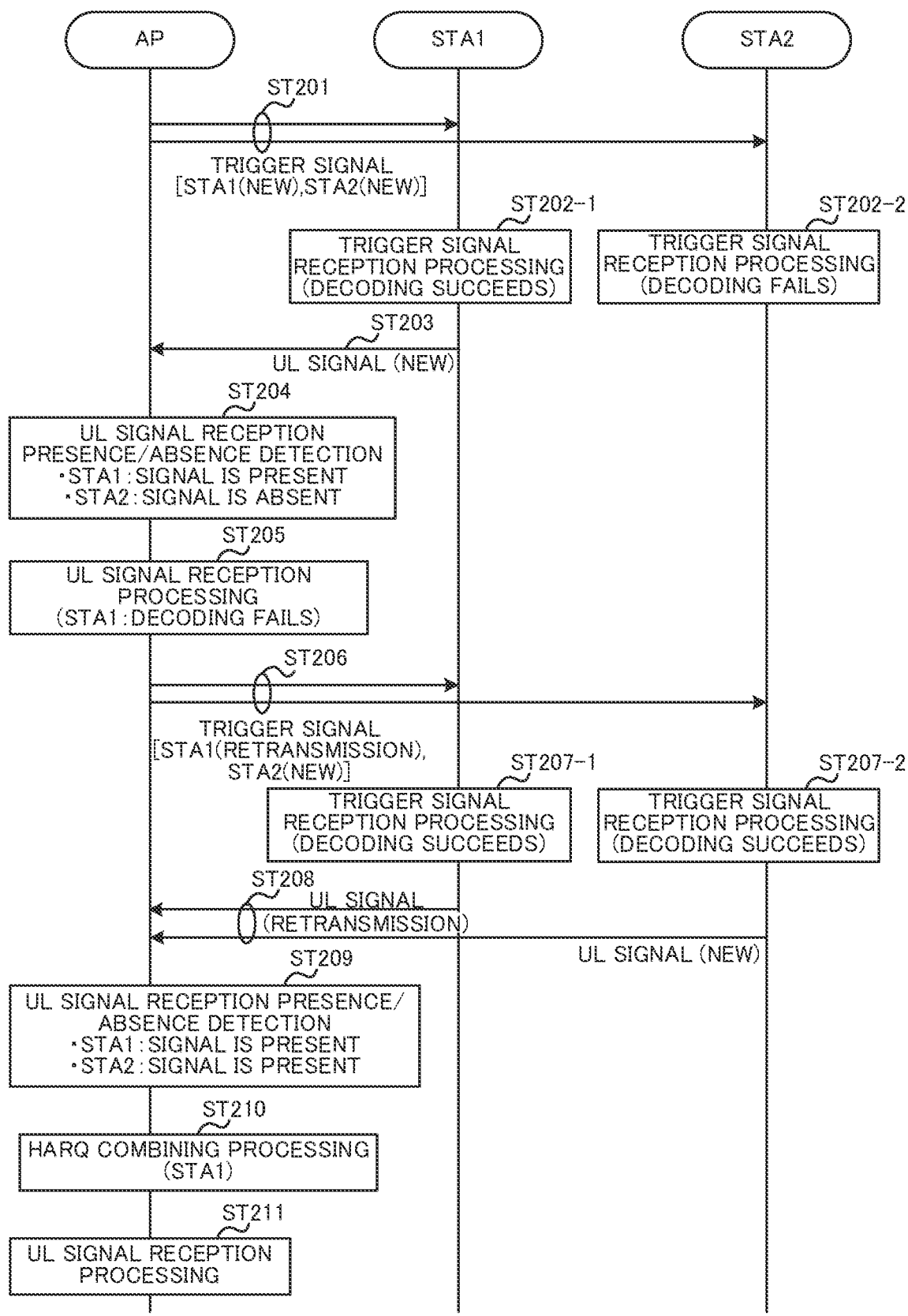
FIG. 14 is a sequence diagram illustrating an exemplary operation of a radio communication system related to uplink radio communication according to Embodiment 2.

Next, FIG. 14 is a sequence diagram illustrating an operation example of radio communication system for UL communication. In FIG. 14, a description will be given of an operation example of MU transmission in an AP (uplink radio reception apparatus 400) and two STAs (STA1 and STA2) (uplink radio transmission apparatuses 300). Note that the number of users (i.e., the number of STAs) to be multiplexed in MU transmission is not limited to two, and may be three or more.

In FIG. 14, the AP transmits a trigger signal (e.g., Trigger frame) indicating UL MU transmission of a UL signal to STA1 and STA2 (ST201). In FIG. 14, the type (e.g., HARQ Type) of transmission packet indicated to STA1 and STA2 is a new packet. Further, in the trigger signal (e.g., Trigger frame) indicating UL MU transmission, HARQ Type is included in the common information (e.g., Common Info field).

STA1 and STA2 perform reception processing (such as decoding processing) on the trigger signal (ST202-1 and ST202-2). STA1 successfully decodes the trigger signal (i.e., decoding succeeds), herein. Meanwhile, STA2 cannot successfully decode the trigger signal due to, for example, a collision of packets or a decoding failure of the trigger signal (i.e., decoding fails).

Since STA1 successfully decodes the trigger signal, STA1 determines whether the packet to be indicated for transmission in the user information corresponding to STA1 is a new packet or a retransmission packet (i.e., HARQ type) based on the HARQ information (e.g., HARQ Type) included in the common information of the trigger signal. STA1 generates a UL signal based on parameters included in the user information of the configuration corresponding to the determined HARQ type (new packet, herein) and transmits the UL signal to the AP (ST203).

Meanwhile, since STA2 has failed in successfully decoding the trigger signal, STA2 determines not to transmit a UL signal to the AP Note that, examples of the cases where no response is made from an STA to the AP include: a case where the reception of a trigger signal is successful in the STA but no response can be transmitted due to the busy state in carrier sense; a case where the reception of Trigger for Uplink OFDMA based random access (UORA) is received in the STA, but no response is made due to the absence of pending data or because the Contention on Window (CW) counter does not become zero; and a case where the reception of the trigger signal is successful and a UL response is transmitted, but the AP fails in receiving a preamble of the UL response.

The AP detects whether or not the UL signal transmitted from each STA is received in a certain period of time after transmission of the trigger signal (ST204). With this detection, the AP determines whether or not each STA has correctly received the trigger signal and then transmitted the UL signal. In FIG. 14, the AP determines that there is a UL signal for ST1, while determining that there is no UL signal for STA2.

Further, the AP performs the reception processing (e.g., demodulation, decoding, and error detection processing) on the UL signal transmitted from each STA (STA1 in FIG. 14) based on the HARQ information indicated using the trigger signal (ST205). In FIG. 14, there is an error in the UL signal transmitted from STA1 in the AP. (i.e., decoding fails). The AP saves the UL signal (i.e., packet data) transmitted from STA1 before decoding in a buffer.

The AP performs scheduling of a new packet or a retransmission packet based on, for example, an error detection result of the UL signal. In FIG. 14, the AP generates a trigger signal (e.g., including HARQ Type) indicating transmission of a retransmission packet for STA1 for which decoding of the UL signal has failed and transmission of a new packet for STA2 from which no UL signal has been received, and transmits the trigger signal to STA1 and STA2 (ST206), for example.

STA1 and STA2 perform the reception processing (such as decoding processing) on the trigger signal (ST207-1 and ST207-2). STA1 and STA2 successfully decode the trigger signal (i.e., decoding succeeds), herein.

Since STA1 has successfully decoded the trigger signal, STA1 determines that transmission of a retransmission packet is indicated, based on the HARQ information included in the common information of the trigger signal. STA1 determines a retransmission packet based on the HARQ information included in the user information and the transmission signal saved in the buffer last time, and transmits the retransmission packet to the AP (ST208). Since STA2 has successfully decoded the trigger signal, STA2 determines that transmission of a new packet is indicated, based on HARQ information included in the common information of the trigger signal. STA2 determines a new packet and transmits the new packet to the AP (ST208).

Accordingly, the UL signal from STA1 and STA2 is transmitted in UL MU transmission (e.g., MU-MIMO transmission or OFDMA transmission) in ST208. As described above, each STA controls transmission of a UL signal based on a control signal indicating UL MU transmission (e.g., Trigger frame).

The AP determines whether or not each STA has correctly received the trigger signal and has transmitted a UL signal as in the processing of ST204 (ST209). In FIG. 14, the AP determines that a UL signal is present for STA1 and STA2.

The AP performs HARQ combining of a retransmission packet transmitted from STA1 and the packets transmitted from STA1 last time and saved in the buffer (ST210). The AP then performs reception processing (e.g., demodulation, decoding and error detection processing) on the combined packet for STA1 and a new packet for STA2 (ST211).

Thus, the AP controls reception of a UL signal based on a control signal (e.g., Trigger frame) indicating UL MU transmission.

Note that, in FIG. 14, the case has been described where a retransmission indication is given by an AP, using a trigger signal (e.g., Trigger frame). The AP, however, may transmit an immediate ACK or Block ACK to the STA immediately after receiving the packets transmitted from the STA. In this case, NACK may be defined, in addition to the immediate ACK and Block ACK. Further, the AP may also make retransmission indication by transmitting the immediate ACK and Block ACK and Trigger frame in the same packet.

In addition, in a case where the AP receives a UL signal in UL MU transmission, the AP may transmit "Multi-STA BlockAck" including NACK information at the time of retransmission when transmitting "Multi-STA BlockAck/Nack" to a plurality of STAs. As the definition of "Multi-STA BlockAck/Nack," a format corresponding to an ACK/NACK signal in a single frame is possible, or Aggregate MAC Protocol Data. Unit (A-MPDU) in which Multi-STA BlockAck and Multi-STA BlockNack are concatenated is also possible, or ACKs or NACKs addressed to the respective STAs may be multiplexed in OFDMA or MU-MIMO.

When an AP transmits BlockAck to an STA, the STA can recognize that a preamble of the initial transmission has been transmitted (delivered) to the AP at the time point when the STA receives BlockAck. Therefore, the STA may define that it is NACK when a bitmap of BlockAck (e.g., BlockAck bitmap) is all 0.

Further, depending on the processing capability of the STA, there is a possibility that the HARQ retransmission corresponding to the trigger signal from the AP is not prepared in time. Therefore, the STA may indicate to the AP via the capability' information (e.g., capability) at the time of association or the like, whether or not retransmission is possible immediately after receiving the trigger signal. When the STA cannot perform retransmission immediately, the AP may perform, for the STA, RU allocation for HARQ retransmission in a Trigger frame or in a subsequent Trigger frame without performing RU allocation in the Trigger frame indicating retransmission. In this case, however, the STA may indicate a NACK or BlockNack to the AP.

The indication of UL MU transmission is not limited to a Trigger frame, and may be made in a frame including a Triggered response scheduling (TRS) Control subfield, for example.

[Method for Generating HARQ Information]

Next, a description will be given of an exemplary method for generating HARQ information indicated from an AP (e.g., downlink radio transmission apparatus 100 or uplink radio reception apparatus 400) to an STA (e.g., downlink radio reception apparatus 200 or uplink radio transmission apparatus 300).

Hereinafter, a description will be given of Methods 1 to 4 relating to the method for generating HARQ information (e.g., determination of size or field type) in a control signal (e.g., SIG-B or Trigger frame included in MU PPDU) for multi-user transmission including common information and user information.

<Method 1>

In Method 1, HARQ information (e.g., HARQ Type) included in common information includes a value for each user (i.e., STA).

Figure 15:
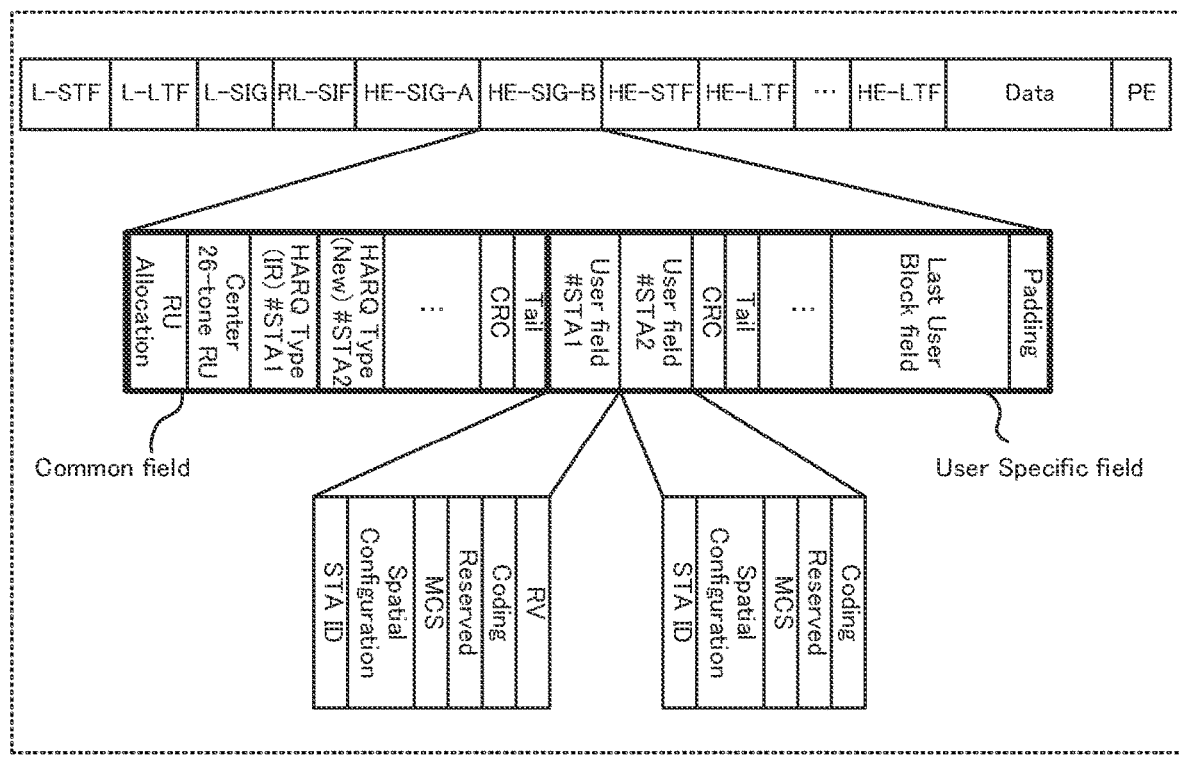
FIG. 15 is a diagram illustrating an exemplary SIG-B format according to Method 1 of Embodiment 2.

FIG. 15 illustrates an exemplary format of a control signal (e.g., SIG-B) indicating DL MU transmission in Method 1.

As illustrated in FIG. 15, the common information (e.g., Common field) includes HARQ Type (e.g., HARQ Type subfield) configured for each STA (STA1 and STA2 as an example in FIG. 15). In FIG. 15, HARQ Type for STA1 is retransmission by IR (hereinafter referred to as IR retransmission), and HARQ Type for STA 2 is a new transmission, for example.

Note that, the number of HARQ Types included in the common information may be, for example, the number of users that can be transmitted in DL MU transmission (e.g., the maximum number of users that can be transmitted). Further, when HARQ Type of the number of transmission users is included in the common information, the AP may indicate the number of transmission users in DL MU transmission in SIG-A (or HE-SIG-A), for example.

Further, for example, for EHT, a new field (e.g., referred to as SIG-HARQ field) for indicating HARQ information different from SIG-A and SIG-B may be added. In this case, the STA can know the number of transmission users in DL MU transmission by RU Allocation of SIG-B. Thus, the AP configures HARQ Type for the number of transmission users in SIG-HARQ.

Figure 16:
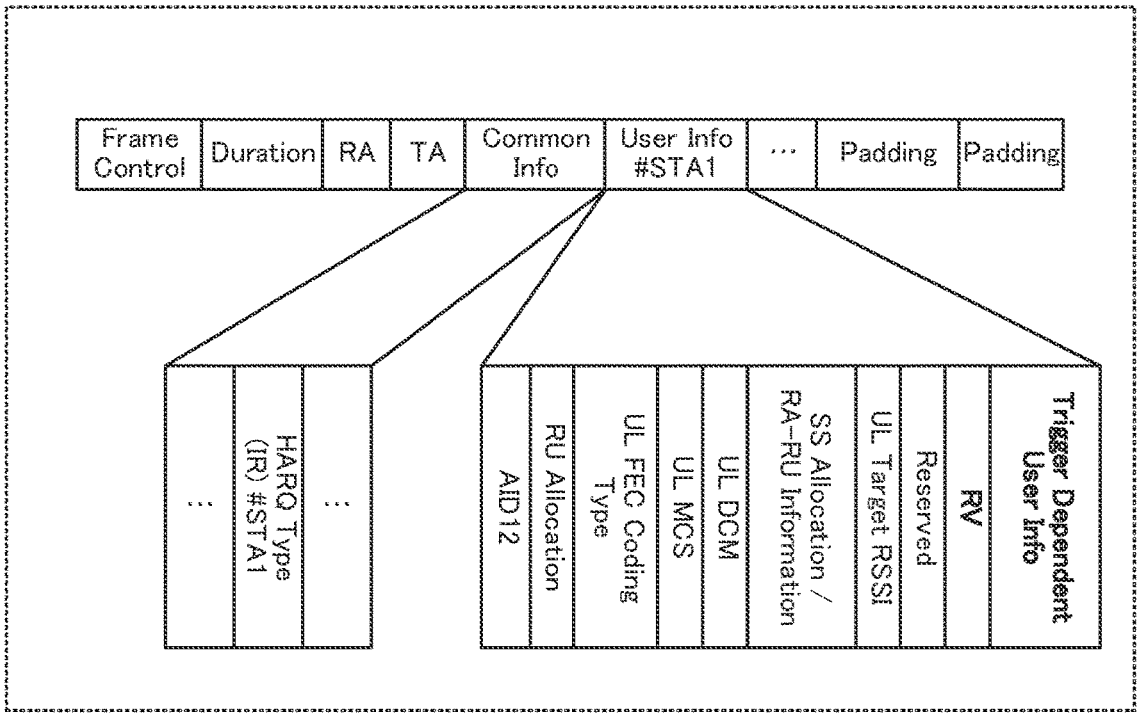
FIG. 16 is a diagram illustrating an exemplary Trigger frame format according to Method 1 of Embodiment 2.

Next, FIG. 16 illustrates an exemplary format of a control signal (e.g., Trigger frame) indicating UL MU transmission in Method 1.

As illustrated in FIG. 16, the common information (e.g., Common Info field) includes HARQ Type (e.g., HARQ Type sub field) configured for each STA (STA1 as an example in FIG. 16). For example, in FIG. 16, HARQ Type for STA1 is IR retransmission.

Further, in FIGS. 15 and 16, the format (e.g., the number of or type of parameters included in the user information) of the user information is configured in accordance with HARQ information included in the common information. The STA, for example, determines the format (i.e., the configuration) of the user information based on the HARQ information included in the common information.

FIG. 17A illustrates a configuration example of HARQ information included in the user information.

When HARQ Type is IR retransmission, for example, RV corresponding to each number of transmissions (i.e., the number of retransmissions) is indicated from the AP to the STA. Thus, as illustrated in FIG. 17A, when HARQ Type is IR retransmission, the user information includes RV. In other words, when HARQ Type is IR retransmission, a subfield indicating RV is added to the user information field (User Specific field or User Info field).

Meanwhile, when HARQ Type is a new transmission or a retransmission by CC (hereinafter referred to as CC retransmission), for example, RV may be configured with a static value (e.g., a value defined in specification, e.g., RV=0). Therefore, as illustrated in FIG. 17A, when HARQ Type is a new transmission or CC retransmission, RV indication (i.e., additional subfield) is unnecessary. In other words, when HARQ Type is a CC retransmission, no subfield indicating RV is added to the user information field (User Specific field or User Info field).

Note that, HARQ Type is not limited to the three types including a new transmission, CC retransmission, and IR retransmission as illustrated in FIG. 17A. As illustrated in FIG. 17B, for example, HARQ Type may be of two types including a new transmission and a retransmission. In FIG. 17B, for example, in the case of retransmission, a subfield used for indicating RV is added regardless of CC and IR. In the case of CC, for example, RV=0 is indicated regardless of the number of transmissions of packets, and in the case of IR, the value of RV corresponding to the number of transmissions of packets is indicated, so that HARQ combining methods may be distinguished from one another.

As described above, the formats (configurations) of the user information differ in accordance with the HARQ Type configured for each user.

In FIG. 15, for example, in the common information, the HARQ Type configured for STA1 indicates IR retransmission and the HARQ Type configured for STA2 indicates a new transmission. In this case, the AP configures HARQ information (e.g., RV) in the user information (User Specific field) for STA1, and does not configure HARQ information (e.g., RV) in the user information for STA2. Likewise, in FIG. 16, the HARQ Type configured for STA1 indicates IR retransmission in the common information, for example. In this case, the AP configures HARQ information (e.g., RV) in the user information (User Info field) for STA1 with HARQ information (e.g., RV). Note that, in FIG. 16, in a case where the HARQ Type configured for an STA in the common information indicates a new transmission (or in the case of CC retransmission in FIG. 17A), the AP does not configure HARQ information in the user information for the STA (not illustrated).

Note that, each STA can identify the format (e.g., the size or the presence or absence of RV information) of the user information configured for each of a plurality of STAs, for example, based on HARQ Type of each of the plurality of STAs included in the common information. Therefore, each of the STAs can identify the stored location of the user information for the STA even when the format of the user information is configured to be variable as described above.

As described above, in Method 1, the format configuration of the user information (i.e., the presence or absence of HARQ information) is determined according to HARQ Type configured for each STA in the common information. Thus, the format of the user information for each STA is configured to be variable in accordance with HARQ Type of each STA. Thus, for example, STA using HARQ information (e.g., RV) (i.e., STA to which IR retransmission is indicated) can perform retransmission control (e.g., reception and combining of retransmission packets or transmission of retransmission packets), using the HARQ information included in the user information.

Meanwhile, for example, no HARQ information is indicated in the user information for the STA that does not use HARQ information STA for which new transmission or CC retransmission is indicated). Thus, according to Method 1, the signaling amount can be reduced compared with the case where HARQ information is configured fixedly, for example, as illustrated in FIGS. 3 and 4.

The target value of the packet error rate, herein, may be about 10% in general. For this reason, the occurrence rate of retransmission packets is low, compared with new packets. Accordingly, in the operation of this packet error rate, the effect of reducing the signaling amount brought about by not including RV in the user information when transmission of a new packet is indicated as in Method 1 is large compared with the case where HARQ information is fixed configured as illustrated in FIGS. 3 and 4.

Note that, in the examples illustrated in FIGS. 15 and 16, the field of HARQ information for each user included in the common information is configured separately for each user (e.g., STA), but it is not limited to this case. HARQ information (e.g., HARQ Type) for each user may be stored in one field in the common information, for example. HARQ Type of each user may be presented in a bitmap format in one field of HARQ information in common information, for example.

<Method 2>

In Method 2, HARQ information (e.g., HARQ Type) included in the common information includes a value common to a plurality of users (i.e., STAs).

In Method 2, HARQ Type included in the common information is common to a plurality of users subject to MU transmission, for example. Accordingly, since the format common to HARQ information is used for the common information, it is possible to reduce the signaling amount of HARQ Type included in the common information.

The AP schedules the transmission packets for the users subject to MU transmission based on the HARQ Type configured in the common information, for example.

Figure 18A:
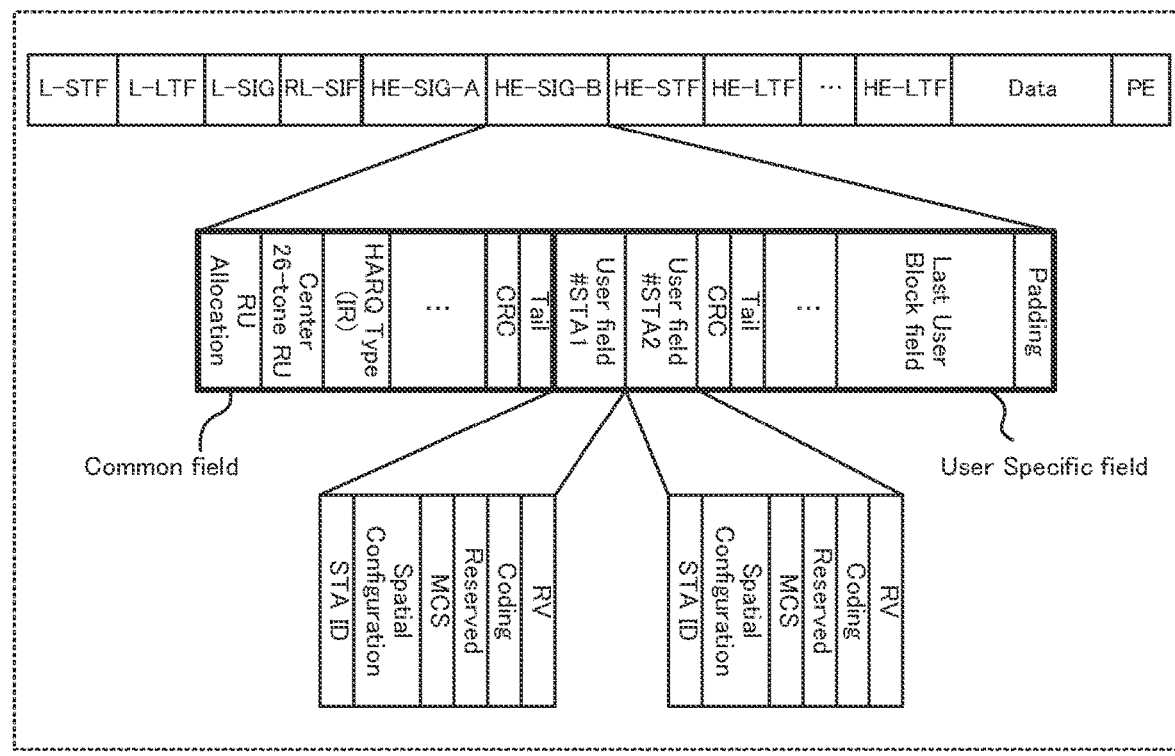
FIG. 18A is a diagram illustrating an exemplary SIG-B format according to Method 2 of Embodiment 2.
Figure 18B:
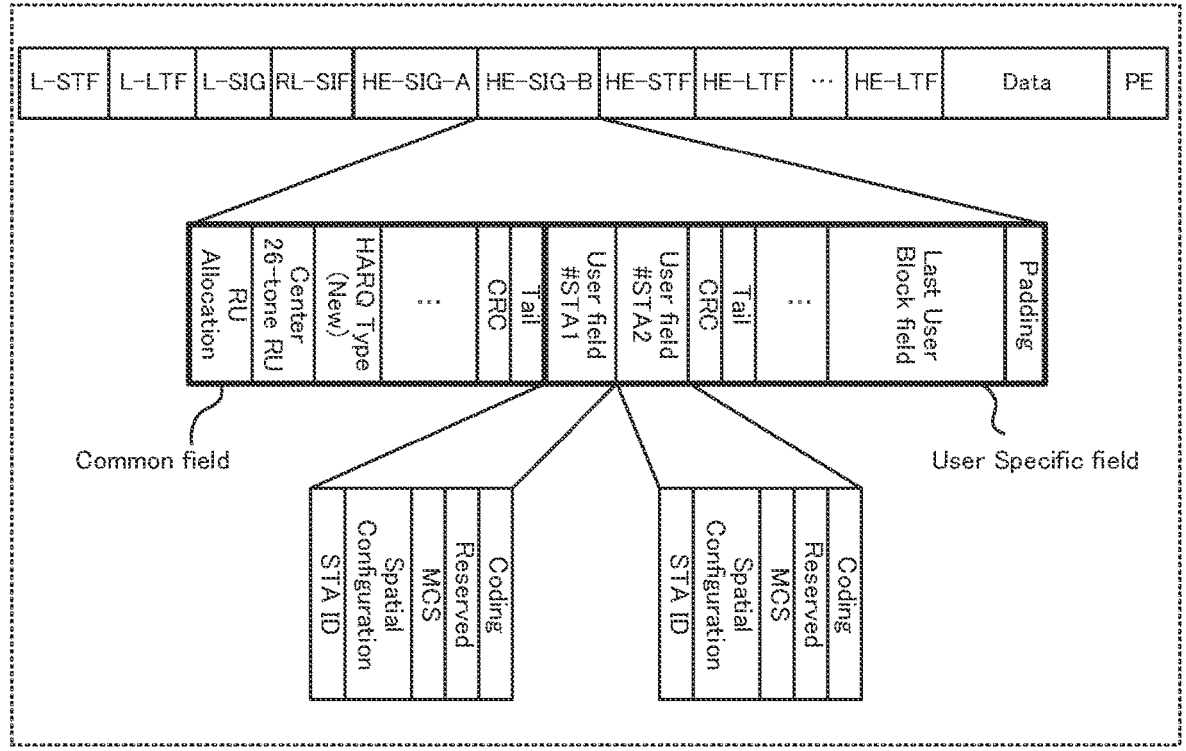
FIG. 18B is a diagram illustrating an exemplary SIG-B format according to Method 2 of Embodiment 2.

FIGS. 18A and 18B each illustrate an example of a format of control information SIG-B) indicating DL MU transmission in Method 2.

Figure 19A:
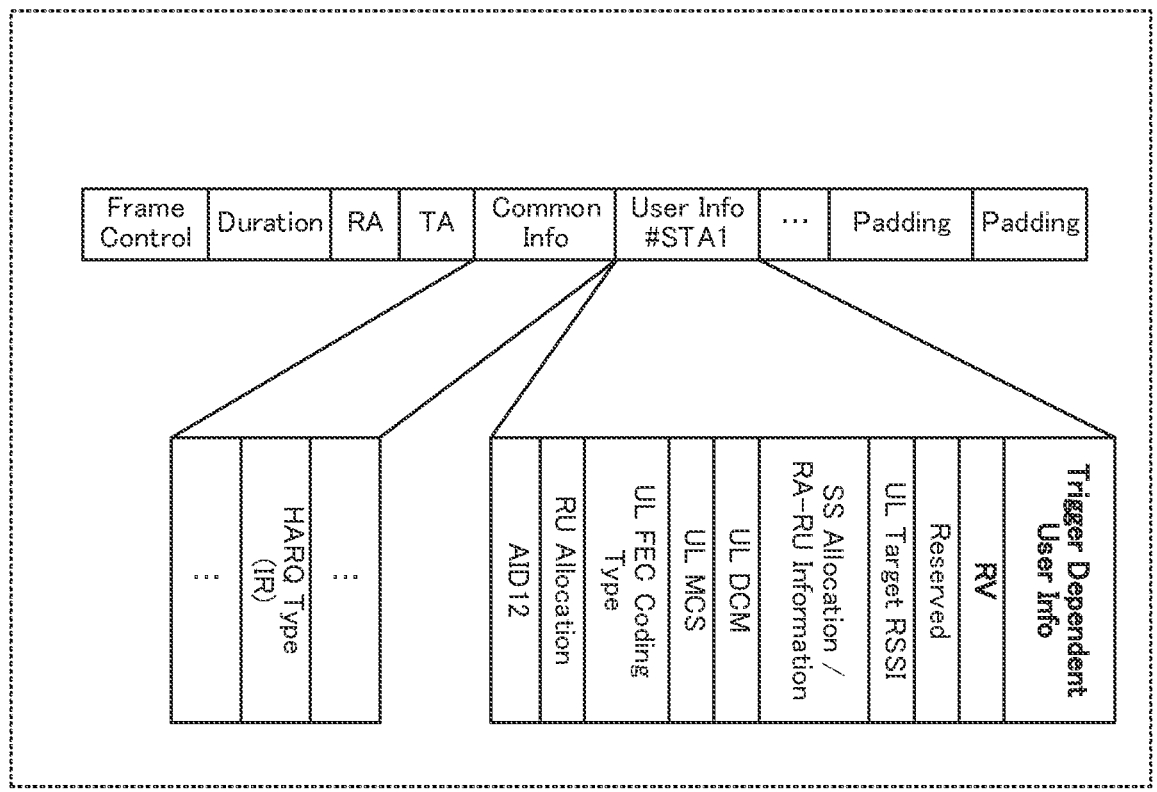
FIG. 19A is a diagram illustrating an exemplary Trigger frame format according to Method 2 of Embodiment 2.
Figure 19B:
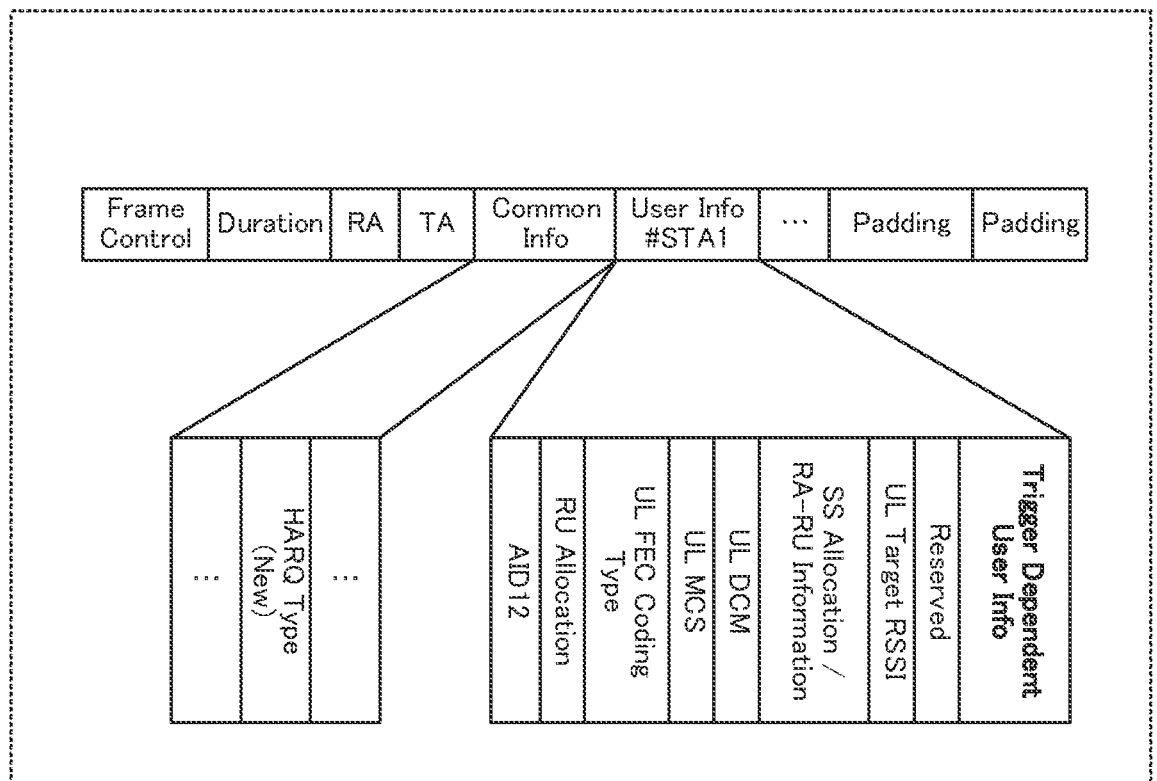
FIG. 19B is a diagram illustrating an exemplary Trigger frame format according to Method 2 of Embodiment 2.

FIGS. 19A and 19B each illustrate an example of a format of control information (e.g., Trigger frame) indicating UL MU transmission in Method 2.

As illustrated in FIGS. 18A and 18B and FIGS. 19A and 19B, HARQ Type common to a plurality of STAs is included in common information (e.g., Common field or Common Info field). In FIGS. 18A and 18B and FIGS. 19A and 19B, for example, one HARQ information field is provided in the common information regardless of the number of users (e.g., the number of STAs). Further, in FIGS. 18A and 19A, HARQ Type is an IR retransmission, and in FIGS. 18B and 19B, HARQ Type is a new transmission.

Further, in FIGS. 18A and 18B and FIGS. 19A and 19B, the formats of user information (e.g., the number of or the type of parameters included in the user information) are configured in accordance with HARQ information included in the common information. The STA determines the format (i.e., the configuration) of the user information based on the HARQ information included in the common information, for example. In Method 2, as in Method 1, the format of the user information may be configured based on the relationship between the HARQ Type and the additional subfield illustrated in FIG. 17A or FIG. 17B, for example.

As illustrated in FIGS. 18A and 18B and FIGS. 19A and 19B, the formats (configuration) of the user information differ in accordance with the HARQ Type to be configured in the common information, for example. Note that, in Method 2, since the HARQ Type included in the common information is common to the plurality of STAs, the format of the user information is also the same among the plurality of STAs.

For example, as illustrated in FIG. 18A and FIG. 19A, when the HARQ Type configured in the common information indicates IR retransmission, the AP configures the user information (User Specific field or User Info field) HARQ information (e.g., RV) for each STA. Meanwhile, as illustrated in FIG. 18B and FIG. 19B, when the HARQ Type configured in the common information indicates a new transmission, the AP configures no HARQ information (e.g., RV) in the user information (User Specific field or User Info field) for each STA. Note that, in the case of CC retransmission, the format of the user information may be determined in the same manner as in Method 1.

Note that, each STA can identify the format of user information (e.g., the size or the presence or absence of RV information) that is commonly configured for STAs based on HARQ Type common to the plurality of STAs included in the common information, for example. Accordingly, each STA can identify the stored location of the user information for the STA even when the format of the user information is configured to be variable as described above.

Further, even when the HARQ Type (e.g., first transmission or retransmission) of a plurality of STAs subject to MU transmission differs, for example, the AP may configure HARQ Type common to STAs in the common information. The HARQ Type included in the common information may be determined in accordance with the priorities of HARQ Types of STAs, for example. The AP may configure an HARQ type with a higher-priority among a plurality of STA in the common information, for example.

The priorities of HARQ Types may be configured, for example, in descending order of the number of pieces of HARQ information (e.g., RV and NDI) to be added to the user information. In the case of FIG. 17A, for example, the priority of HARQ Type may be "IR">"CC and New Transmission." Further, in FIG. 17B, the priority of HARQ Type may be retransmission>New Transmission, for example.

Further, in the case of an example illustrated in FIG. 20, the priority of HARQ Type may be IR>CC>new transmission without being limited to the examples illustrated in FIG. 17A and FIG. 17B.

In the case of FIG. 20, when the HARQ Type to be configured in the common information is IR, RV and NDI are included in the user information. The STA may determine, with reference to the RV and NDI included in the user information corresponding to the STA, the HARQ Type actually configured for the STA, for example.

The AP may indicate HARQ Type=IR in the common information and indicate NDI=1 and RV=0 in the user information for the STA to which CC retransmission is indicated, for example. In this case, the STA can identify that the HARQ Type configured in the STA is CC retransmission although the HARQ Type configured in the common information is IR retransmission.

Further, the AP may indicate HARQ Type=IR in the common information and indicate the NDI=1 and the value of RV corresponding to the number of retransmissions in the user information for the STA to which IR retransmission is indicated, for example. In this case, the STA can identify that the HARQ Type configured in the common information is IR retransmission and that the HARQ Type configured for the STA is also IR retransmission.

Further, the AP may indicate HARQ Type=IR in the common information and indicate NDI=0 and RV=0 in the user information for the STA to which a new transmission is indicated, for example. In this case, the STA can identify that the HARQ Type to be configured for the STA is a new transmission although the HARQ Type to be configured in the common information is IR retransmission.

In the configuration illustrated in FIG. 18A, herein, for example, the signaling amount for the common information increases (e.g., 1 to 2 bits) compared with the configuration illustrated in FIG. 3. Further, in the configuration illustrated in FIG. 18B, for example, as compared with the case of FIG. 3, although the signaling amount for the common information increases (e.g., 1 to 2 bits), the signaling amount decreases by the amount of HARQ information (e.g., RV) not included in the user information (e.g., about 2 bits×the number of multiplexed users).

In general, an operation is performed with the target value of the packet error rate being about 10%. In this operation, among the formats of a control signal for MU transmission, the probability of occurrence of the format of a case where HARQ Type is a new transmission (e.g., FIG. 18B) is about 90%, and the probability of occurrence of the format (e.g., FIG. 18A) of a case where HARQ Type is a retransmission (e.g., IR) is about the remaining 10%.

Thus, according to Method 2, with respect to the HARQ information included in the common information, the effect of reducing the signaling amount for the HARQ information included in the user information is large, and thus, the overhead for the entire system can be reduced.

Note that, in the examples of Trigger frames illustrated in FIGS. 19A and 19B, although the case where the HARQ information field is configured in the common information is illustrated, it is not limited to this case.

Figure 21:
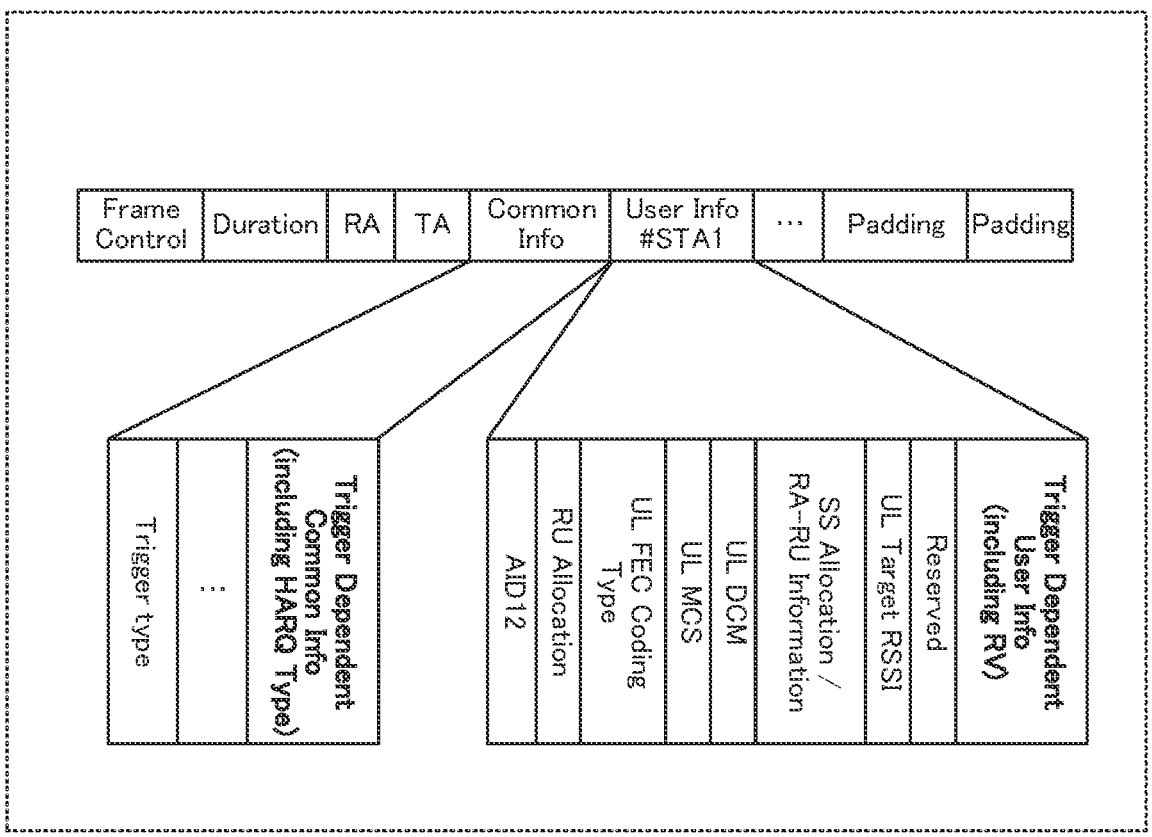
FIG. 21 is a diagram illustrating another exemplary Trigger frame format according to Method 2 of Embodiment 2.

As illustrated in FIG. 21, Trigger Type subfield and Trigger Dependent Common Info subfield are configured in the common information of the Trigger frame, herein, for example. Trigger Type subfield indicates the type of Trigger frame (e.g., type of signal that the AP causes the STA to transmit). Trigger Dependent Common Info subfield can include terminal-common information in accordance with the Trigger type.

Thus, the AP may include HARQ information in Trigger Dependent Common Info subfield of the common information and in Trigger Dependent User Info subfield of the user specific information, for example. In this case, Trigger type capable of including HARQ information may be configured. The AP may include HARQ information in a case where Trigger type is a Basic (Trigger type that indicates a response by a normal uplink data channel (e.g., Scheduled access channel and Random access channel)), for example. The AP may include HARQ type in Trigger Dependent Common Info subfield of the common information and RV information in Trigger Dependent User Info subfield of the user specific information in a case where Trigger type is Basic, for example.

Further, a new Trigger type capable of including HARQ information may be added (e.g., may referred to as "HARQ" trigger). The AP may include HARQ information in a case where Trigger type is HARQ (Trigger type indicating a response via an uplink data channel including retransmission packets), for example. The AP may include HARQ type in Trigger Dependent Common Info subfield of the common information and RV information in Trigger Dependent User Info subfield of the user specific information when Trigger type is HARQ, for example.

Alternatively, the AP may include HARQ information in the common information and the user specific information in a case where Trigger type is Basic or HARQ.

<Method 3>

In Method 3, when HARQ Type is a retransmission, the AP deletes the information that has been already transmitted by the user information included in the control signal indicating transmission of a new packet and that does not change in value between the time of new transmission and the time of retransmission.

In addition, when receiving a control signal indicating retransmission, the STA acquires HARQ information based on the user information associated with the last packet that has been saved in a buffer until the last transmission.

According to Method 3, since the AP does not need to indicate the signal that has been already indicated to the STA, at the time of retransmission, the signaling indicating retransmission can be reduced.

The information deletable in the user information at the time of retransmission differs in accordance with on HARQ Type (e.g., CC and IR) and the type of control signal indicating MU transmission (e.g., SIG-B in the case of DL MU transmission and Trigger frame in the case of UL MU transmission).

FIGS. 22 to 25 each illustrate an example of information that can be deleted in accordance with the type of control signal indicating HARQ Type and MU transmission.

<For CC-Retransmission in SIG-B>

Figure 22:
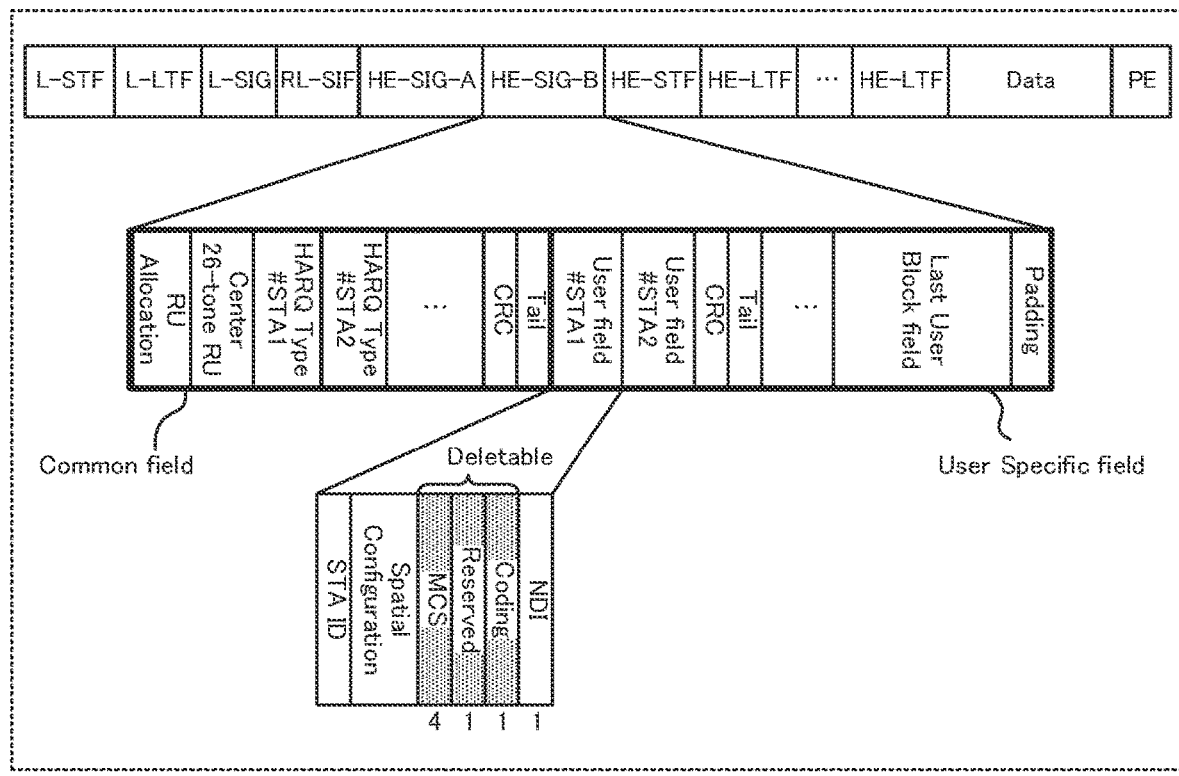
FIG. 22 is a diagram illustrating an exemplary SIG-B format according to Method 3 of Embodiment 2.

FIG. 22 illustrates an example of user information (e.g., User Specific field) in SIG-B when HARQ Type is CC.

As illustrated in FIG. 22, when HARQ Type is CC, the AP may delete any of MCS subfield, Coding subfield and Reserved sub-field. Regarding the information deleted at the time of retransmission, the STA applies the information saved at the time of last transmission. Note that, in FIG. 22, in the case of CC, for example, NDI information is added as HARQ information in the user information.

<For CC Retransmission in Trigger Frame>

Figure 23:
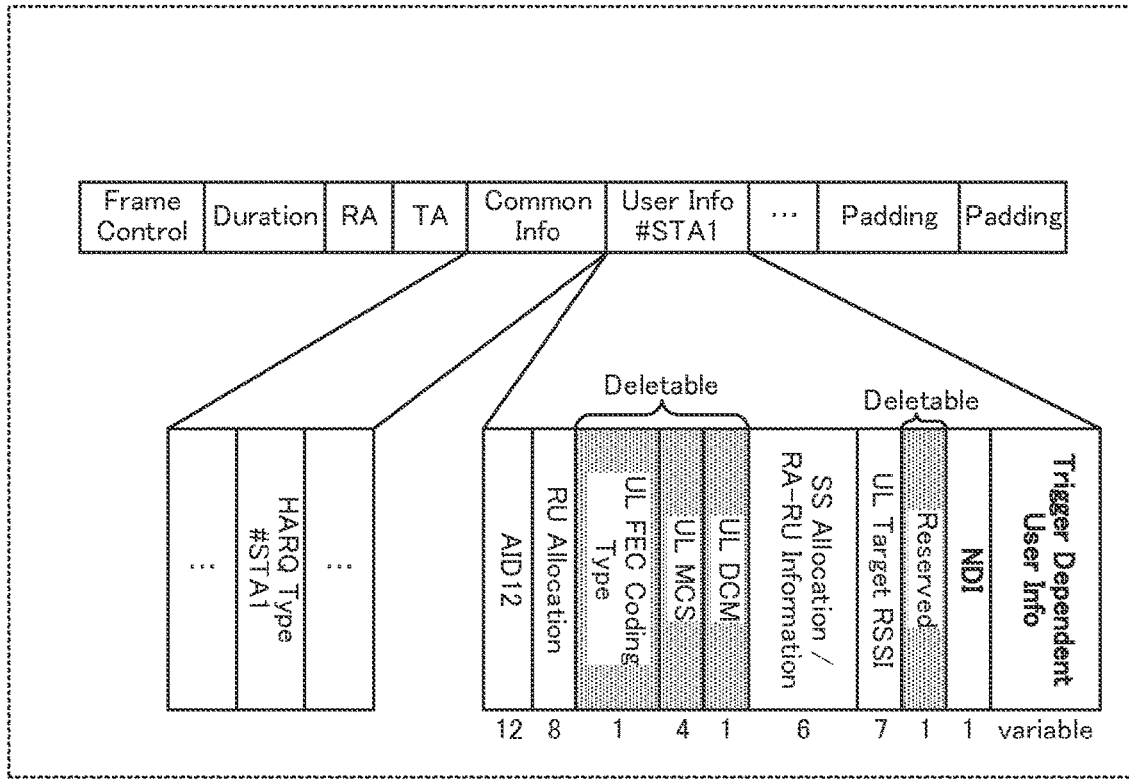
FIG. 23 is a diagram illustrating an exemplary Trigger frame format according to Method 3 of Embodiment 2.

FIG. 23 illustrates an example of user information (e.g., User Info field) in a Trigger frame when HARQ Type is CC.

As illustrated in FIG. 23, when HARQ Type is CC, the AP may delete any of an UL forward error correction (FEC) Coding Type subfield, UL MCS subfield, UL dual subcarrier modulation (DCM) subfield, and Reserved subfield. Regarding the information deleted at the time of retransmission, the STA applies the information saved at the time of last transmission. In FIG. 23, in the case of CC, for example, NDI information is added as HARQ information in the user information.

<For IR Retransmission in SIG-B>

Figure 24:
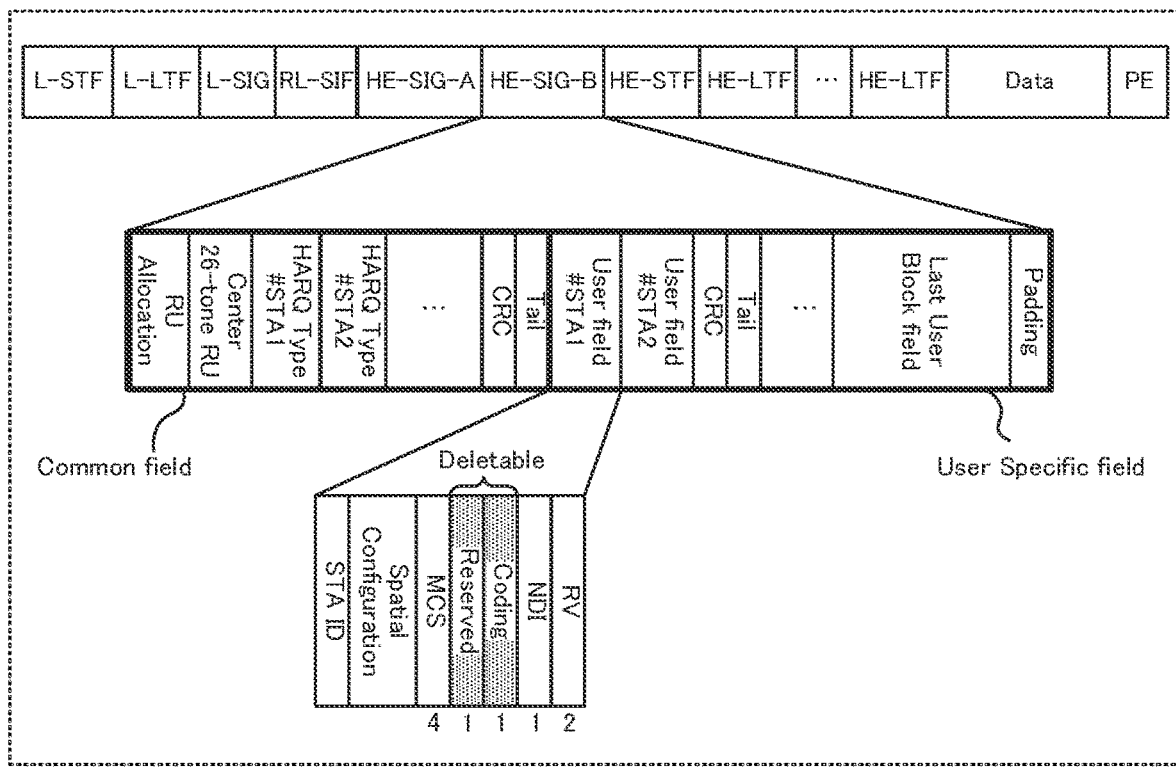
FIG. 24 is a diagram illustrating another exemplary SIG-B format according to Method 3 of Embodiment 2.

FIG. 24 illustrates an example of user information (e.g., User Specific field) in SIG-B when HARQ Type is IR.

As illustrated in FIG. 24, when HARQ Type is IR, the AP may delete any of a Coding subfield and Reserved subfield. Regarding the information deleted at the time of retransmission, the STA applies the information saved at the time of last transmission. Note that, in FIG. 24, in the case of IR, NDI and RV are added as HARQ information in the case of user information, for example.

<For IR Retransmission in Trigger Frame>

Figure 25:
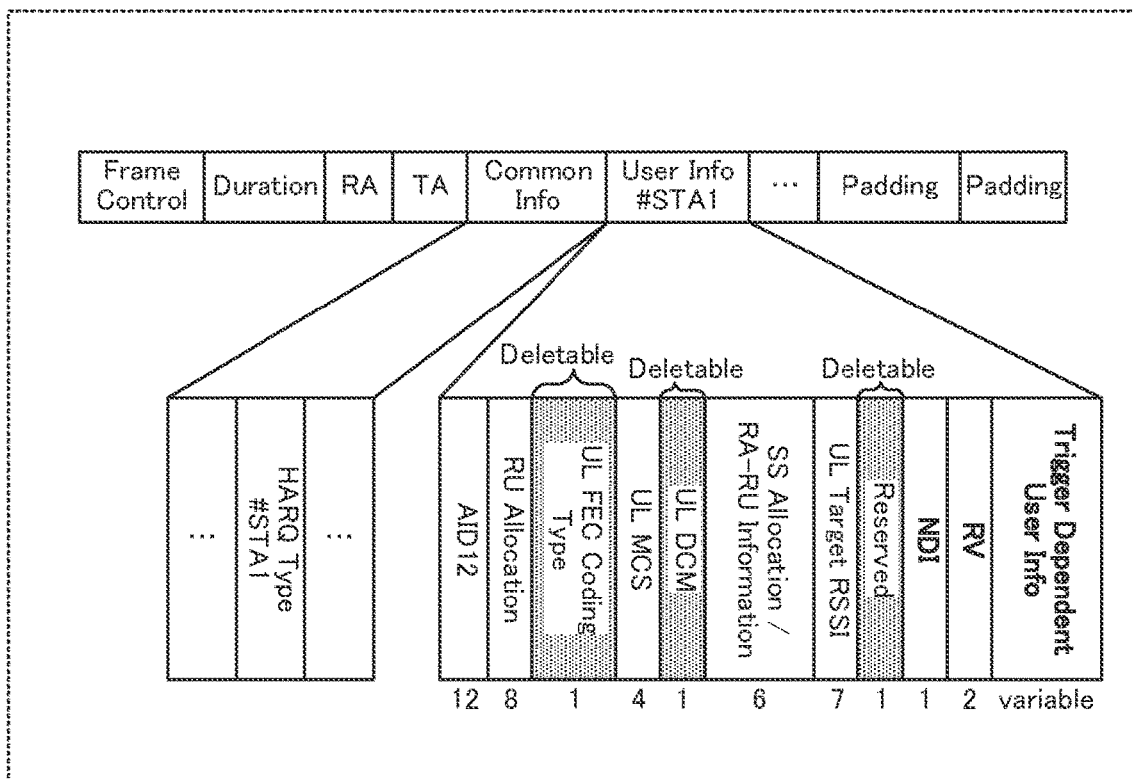
FIG. 25 is a diagram illustrating another exemplary Trigger frame format according to Method 3 of Embodiment 2.

FIG. 25 illustrates an example of user information e.g., User Info field) in Trigger frame when HARQ Type is IR.

As illustrated in FIG. 25, when HARQ Type is IR, the AP may delete any of an UL FEC Coding Type subfield, UL DCM subfield and Reserved sub-field. Regarding the information deleted at the time of retransmission, the STA applies the information saved at the time of last transmission. In FIG. 25, in the case of IR, NDI and RV are added as HARQ information in the user information, for example.

As has been described above, examples of information that can be deleted in accordance with the type of control signal indicating HARQ Type and multi-user transmission have been described.

Note that, the STA can know the configuration (e.g., size) of the user information based on, for example, the HARQ Type of the common information included in the control signal.

As illustrated in FIGS. 22 to 25, when HARQ information indicates retransmission, the AP does not configure at least one of the parameters configured in the user information when HARQ information indicates new transmission. In other words, among a plurality of parameters included in the user information, the number of parameters different from the parameters relating to retransmission control (e.g., RV or NDI) becomes less in a case where HARQ Type indicates retransmission, compared with the case where the HARQ Type indicates new transmission. Thus, according to Method 3, the signaling overhead can be reduced at the time of retransmission based on HARQ Type.

Note that, in FIGS. 22 to 25, the format configuration based on Method 1 has been described, but the format configuration based on Method 2 can be applied in the same manner.

<Method 4>

In Methods 1 to 3, the case where a subfield of HARQ information is newly added to the user information has been described. In Method 4, a case will be described in which the content of the subfield of parameters different from the HARQ information (e.g., parameters defined in 11ax) is replaced with HARQ information.

Figure 26:
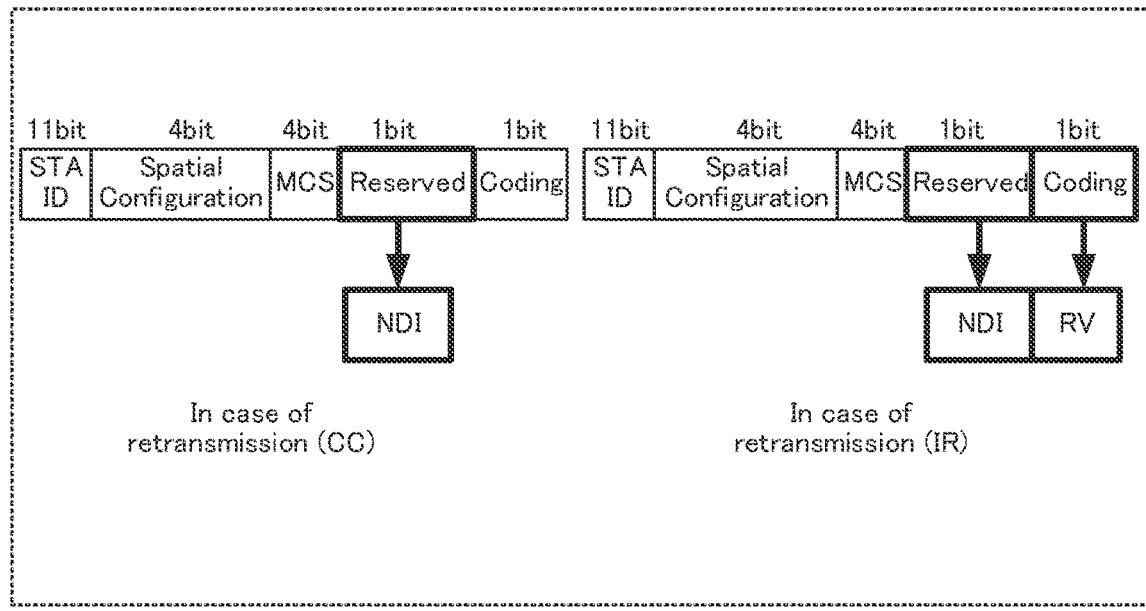
FIG. 26 is a diagram illustrating an exemplary SIG-B format according to Method 4 of Embodiment 2.

FIG. 26 illustrates an example a case where retransmission (CC or IR) is indicated in a control signal (e.g., SIG-B) indicating of DL MU transmission.

As illustrated in FIG. 26, when a CC retransmission is indicated to an STA, a Reserved subfield of SIG-B user information is replaced with the subfield of NDI.

As illustrated in FIG. 26, when the IR retransmission is indicated to the STA, a Reserved subfield of SIG-B user information is replaced with the subfield of NDI, and Coding subfield is replaced with the subfield of RV.

Figure 27:
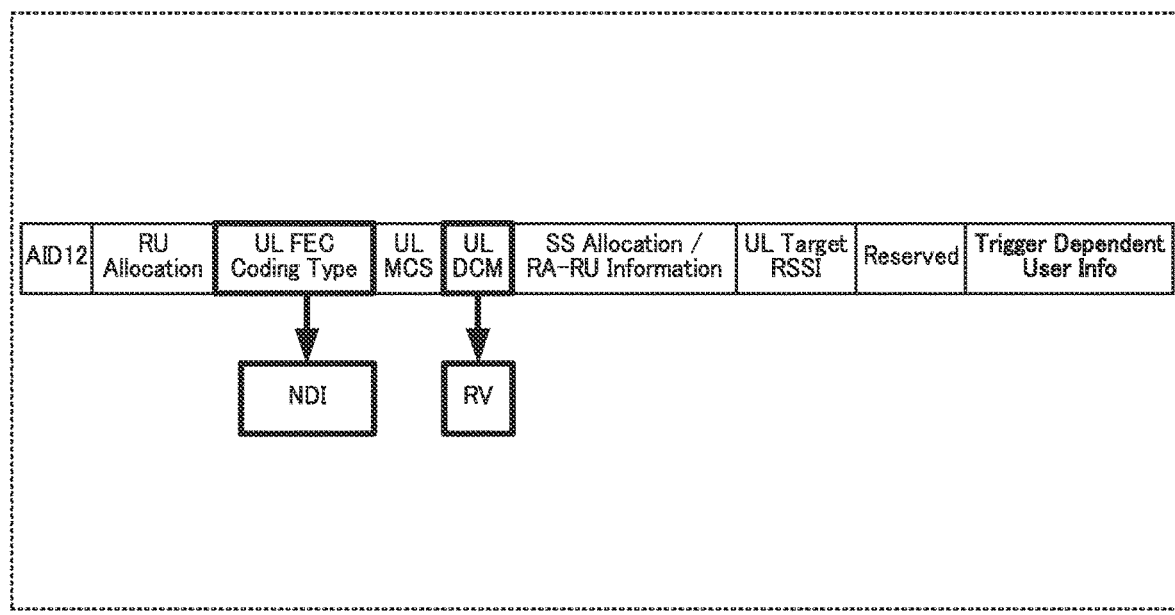
FIG. 27 is a diagram illustrating an exemplary Trigger frame format according to Method 4 of Embodiment 2.

FIG. 27 illustrates an example of a case where a retransmission e.g., IR) is indicated in a control signal (e.g., Trigger frame) indicating UL MU transmission.

As illustrated in FIG. 27, when a retransmission is indicated to the STA, the UL FEC Coding Type subfield of the user information in a Trigger frame is replaced with the subfield of ND1, and the UL DCM subfield is replaced with the subfield of RV.

The AP, for example, switches the information to be included in some subfields of the user information based on whether HARQ Type to be configured in the common information is a new transmission or a retransmission. Further, the STA identifies the information to be indicated in some subfield of the user information, for example, based on whether HARQ Type configured in the common information is a new transmission or a retransmission.

In the user information illustrated in FIG. 26, when a new transmission is indicated, the AP configures an encoding method in the Coding subfield of the user information and does not configure anything in the Reserved subfield, for example. Further, when a new transmission is indicated, the STA acquires an encoding method in the Coding subfield.

Meanwhile, in the user information of SIG-B illustrated in FIG. 26, when IR retransmission is indicated, the AP configures NDI in the Reserved subfield of the user information and configures the RV in the Coding subfield. Further, when IR retransmission is indicated, the STA acquires the NDI in the Reserved subfield of the user information and acquires the RV in the Coding subfield.

The same applies to the CC retransmission illustrated in FIG. 26 or UL MU transmission illustrated in FIG. 27.

As illustrated in FIGS. 26 and 27, in Method 4, the AP configures different types of parameters in the user information between the case where a retransmission is indicated and the case where a new transmission is indicated. In other words, the type of parameter included in the same field (e.g., particular subfield) of user information differs between the case where HARQ Type indicates retransmission and the case where HARQ Type indicates a new transmission.

Thus, replacing the fields in the user information based on HARQ Type of the common information enables indicating HARQ information from an AP to an STA without adding any subfield for HARQ information unlike in FIG. 3 or 4. Thus, the signaling of the user information can be reduced.

Note that, the parameters to be replaced with HARQ information (i.e., subfields) in Method 4 are not limited to the examples illustrated in FIGS. 26 and 27. For example, in the IR retransmission illustrated in FIG. 26, the Reserved subfield may be replaced with the RV subfield, and the Coding subfield may be replaced with the NISI subfield. Further, the subfields to be replaced with the subfield of HARQ information are not limited to the subfields of Reserved, Coding, UL FEC Coding Type and UL DCM subfields, and may be another subfield.

Methods 1 to 4 have been described, thus far.

As described above, according to the present embodiment, the common information included in control signal indicating MU transmission includes a parameter (e.g., HARQ information, such as HARQ Type) relating to retransmission control. Further, according to the present embodiment, the STA determines the configuration of the user information included in the control signal indicating MU transmission, based on the HARQ included in the common information.

Accordingly, the parameters included in the control signal indicating MU transmission can be configured to be variable, in accordance with the control content (e.g., HARQ Type) of HARQ in MU transmission. In MU transmission, for example, the AP can include HARQ information in the user information for the STA to which a retransmission is indicated, without including HARQ information in the user information for the STA to which a new transmission is indicated. This control can reduce the signaling amount for user information. Thus, according to the present embodiment, it is made possible to enhance the efficiency of HARQ retransmission control in MU transmissions.

Embodiment 3

[Exemplary Configuration of Downlink Radio Transmission Apparatus]

Figure 28:
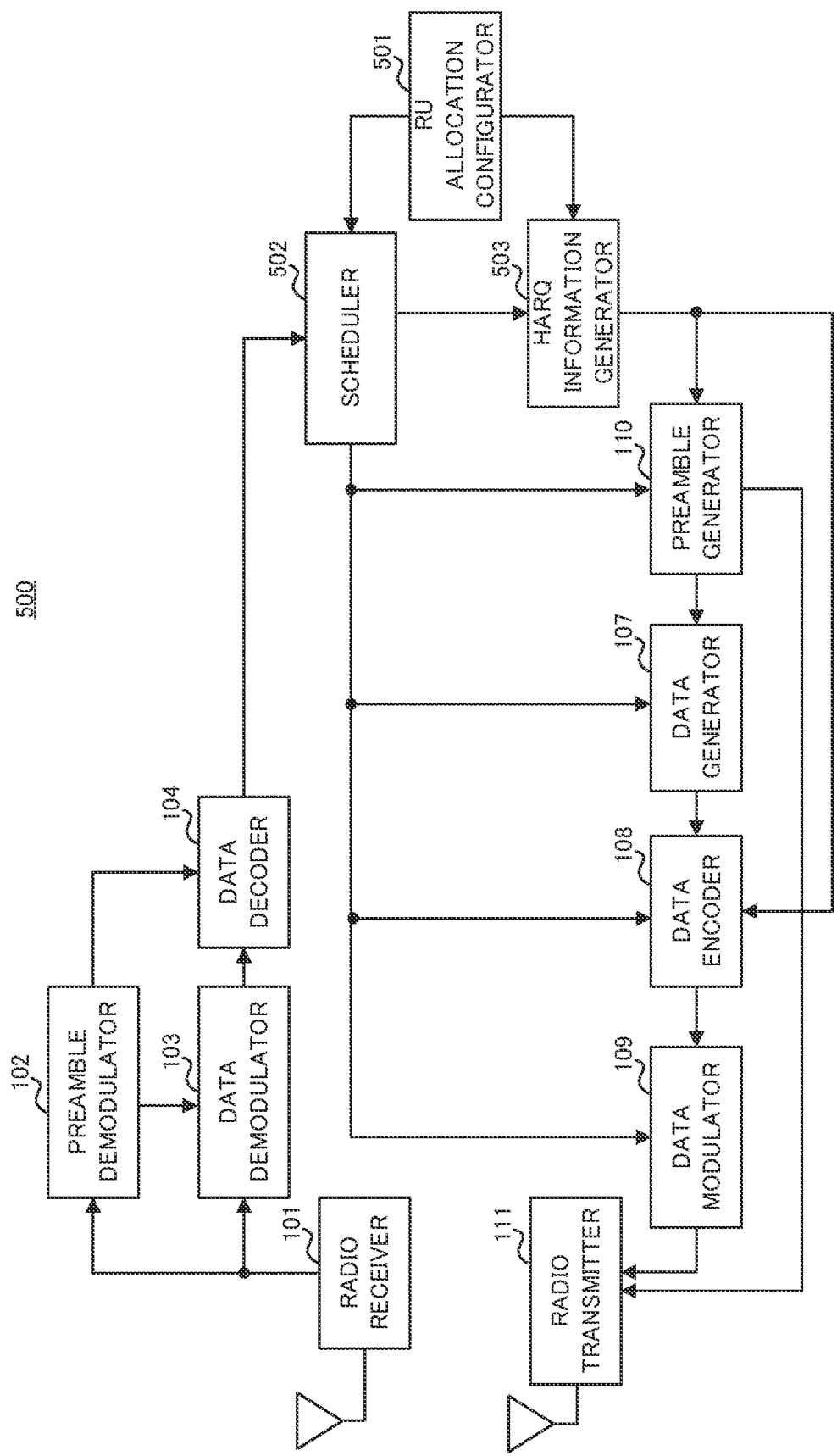
FIG. 28 is a block diagram illustrating an exemplary configuration of a downlink radio transmission apparatus according to Embodiment 3.

FIG. 28 is a block diagram illustrating an exemplary configuration of downlink radio transmission apparatus 500 (e.g., AP) according to the present embodiment. In FIG. 28, the same components as those of Embodiment 2 (FIG. 7) are denoted by the same reference numerals, and the descriptions thereof are omitted. More specifically, downlink radio transmission apparatus 500 is different from downlink radio transmission apparatus 100 according to Embodiment 2 in that RU allocation configurator 501 is added, and in operations of scheduler 502 and HARQ information generator 503.

In FIG. 28, RU allocation configurator 501 configures, for example, an RU allocation information pattern for each STA (i.e., users) in a system band.

The "RU allocation information pattern" indicates, for example, a correspondence between "RU allocation information" (e.g., bit sequence of RU Allocation) included in a control signal indicating MU transmission and "RU allocation pattern" indicating a pattern of RU allocation in a system band. The RU allocation information pattern may be defined in advance by, for example, the specification. Examples of the RU allocation information patterns will be described, hereinafter.

Further, the RU allocation pattern may also include information on HARQ Type (i.e., either new transmission or retransmission) in addition to an RU to be allocated (i.e., allocation resources). In other words, HARQ information (e.g., HARQ Type) to be indicated in the common information is included in the resource allocation information (e.g., RU Allocation) included in the common information.

Further, the RU allocation pattern may include information on the presence or absence of MU-MIMO application (e.g., either Single User-MIMO (SU-MIMO) or MU-MIMO).

RU allocation configurator 501 outputs the information indicating the configured RU allocation information pattern to scheduler 502 and HARQ information generator 503.

Scheduler 502 performs scheduling in accordance with the RU allocation pattern that can be indicated to each STA (e.g., downlink radio reception apparatus 600 to be described, hereinafter), based on the RU allocation information pattern received from RU allocation configurator 501. Scheduler 502 outputs the determined scheduling information to HARQ information generator 503, data generator 107, data encoder 108, data modulator 109, and preamble generator 110.

HARQ information generator 503 converts the scheduling information received from scheduler 502 into RU allocation information (bit sequence, e.g., RU Allocation) to be included in the common information, based on the RU allocation information pattern received from RU allocation configurator 501, and outputs the RU allocation information to data encoder 108 and preamble generator 110.

[Exemplary Configuration of Downlink Radio Reception Apparatus]

Figure 29:
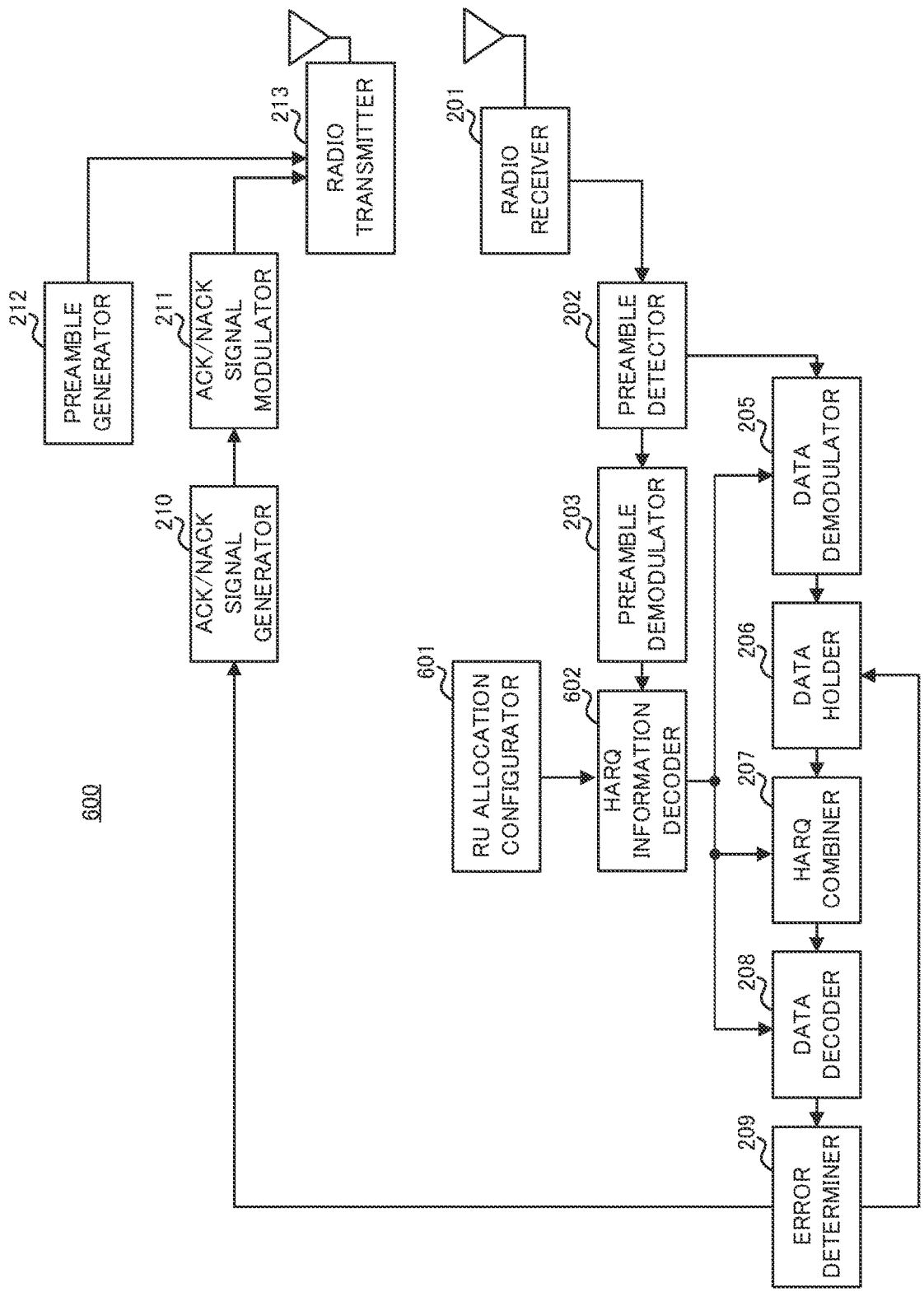
FIG. 29 is a block diagram illustrating an exemplary configuration of a downlink radio reception apparatus according to Embodiment 3.

FIG. 29 is a block diagram illustrating an exemplary configuration of downlink radio reception apparatus 600 (e.g., STA) according to the present embodiment. Note that, in FIG. 29, the same components as those of Embodiment 2 (FIG. 8) are denoted by the same reference numerals, and the descriptions thereof are omitted. More specifically, downlink radio reception apparatus 600 is different from downlink radio reception apparatus 200 according to Embodiment 2 in that RU allocation configurator 601 is added, and in an operation of HARQ information decoder 602.

In FIG. 29, RU allocation configurator 601 performs the same processing as RU allocation configurator 501 of downlink radio transmission apparatus 500 illustrated in FIG. 28. RU allocation configurator 601 outputs, to HARQ information decoder 602, information indicating RU allocation information pattern of downlink radio reception apparatus 600 in a system band (e.g., correspondence between RU allocation information (bit sequence) included in the control signal indicating MU transmission and the RU allocation pattern).

HARQ information decoder 602 decodes HARQ information for the preamble signal received from preamble demodulator 203, in accordance with the configured preamble format. Further, HARQ information decoder 602 decodes (i.e., identifies) the RU allocation resource and HARQ type based on the RU allocation information (bit sequence), in accordance with the RU allocation information pattern received from RU allocation configurator 601. Note that, the HARQ information obtained based on the RU allocation information pattern may include, for example, information indicating the presence or absence of MU-MIMO application. HARQ information decoder 602 outputs the decoded HARQ information to data demodulator 205, HARQ combiner 207, and data decoder 208.

[Exemplary Operations of AP and STA]

Next, exemplary operations of an AP (e.g., downlink radio transmission apparatus 500) and an STA (e.g., downlink radio reception apparatus 600) according to the present embodiment will be described.

The control signal (e.g., SIG-B) indicating MU transmission includes, for example, common information and user information. In the present embodiment, for example, HARQ information is included in RU allocation information (e.g., RU Allocation) for each STA included in the common information. The HARQ information included in the RU allocation information is, for example, information indicating HARQ Type. Note that, HARQ Type may include a type (such as CC or IR) of HARQ retransmission control.

Methods 1 to 3 relating to the generation of RU allocation information included in the common information will be described.

Hereinafter, for example, SIG-B of 11ax will be described as an example. The RU allocation information (RU Allocation sub-field) included in the common information (e.g., Common field) of SIG-B is firmed of 8 bits. Further, in 11ax, some of the bit sequence (e.g., 76 patterns) among the bit sequence of 8 hits of RU Allocation is a Reserved pattern in which no RU allocation pattern is configured.

Therefore, in the present embodiment, for example, an RU allocation pattern including HARQ Type is associated with these Reserved patterns. Accordingly, the HARQ information can be indicated to an STA from an AP without increasing the signaling overhead for HARQ information.

<Method>

FIG. 30 illustrates an exemplary RU allocation information pattern in Method 1.

As illustrated in FIG. 30, HARQ Type (e.g., the presence or absence of HARQ retransmission) is included in some patterns (e.g., Reserved pattern in FIG. 30) among RU allocation patterns associated with RU allocation information (RU Allocation).

In FIG. 30, when a bit sequence of RU Allocation is 11100001, five users (e.g., User 1 to User 5) are frequency multiplexed, for example. User 1 is assigned a new packet (i.e., no HARQ retransmission) of RU #1 to RU #2 (52 tones), User 2 is assigned a new packet (i.e., no HARQ retransmission) of RU #3 to RU #4 (52 tones), User 3 is assigned a new packet (i.e., no HARQ retransmission) of RU #5 (26 tones), User 4 is assigned a new packet (i.e., no HARQ retransmission) of RU #6 to RU #7 (52 tones), and User 5 is assigned a retransmission packet (i.e., no HARQ retransmission) of RU #8 to RU #9 (52 tones), for example.

In addition to an RU allocation pattern, HARQ Type is also included likewise in other bit sequences of RU Allocation illustrated in FIG. 30.

According to Method 1, the AP can indicate HARQ information (e.g., HARQ Type (indication of new transmission or retransmission)) in the common information to STAs without increasing the signaling overhead for HARQ information.

<Method 2>

FIG. 31 illustrates an exemplary RU allocation information pattern in Method 2.

As illustrated in FIG. 31, some patterns (e.g., Reserved pattern) of the RU allocation pattern associated with the RU allocation information (RU Allocation) includes HARQ Type (e.g., the presence or absence of HARQ retransmission).

In FIG. 31, the RU to which MU-MIMO is applied is assigned no retransmission packet. In other words, in FIG. 31, RU allocation information indicates that a retransmission packet (i.e., retransmission opportunity for a data signal) is assigned to an RU (e.g., resource used for SU multiplexing) different from an RU used for MU multiplexing (e.g., MIMO) in Method 2.

MU-MIMO is applied to RUs of 106 tones or more (e.g., four or more RUs) in 11ax, for example. In 11ax, the RU allocation pattern includes the number of MU multiplexed users (i.e., the number of STAs). In FIG. 31, when a bit sequence of RU Allocation is 00010001 to 00010111 (not fully illustrated), new packets for MU-MIMO of two to eight multiplexed users are allocated to the frequency resources of RU #6 to RU #9 (106 tones), for example.

In FIG. 31, for example, when a bit sequence of RU Allocation is 00010000, SU-MIMO is applied to the frequency resources of RU #6 to RU #9 (106 tones), and new packets are assigned. In FIG. 31, when a bit sequence of RU Allocation is 11100001 (Reserved pattern), SU-MIMO is applied to the frequency resources of RU #6 to RU #9 (106 tones), and retransmission packets are assigned, for example.

The packets to be MU multiplexed, herein, have a larger interference than not MU multiplexed packets (e.g., including SU multiplexed packets), and are likely to degrade in performance. Thus, the impact on performance degradation because of not assigning retransmission packets to RUs of 106 tones or more to which MIMO can be applied (i.e., MU multiplexable RUs) (i.e., not applying MU-MIMO to retransmission packets) is small. In other words, the packets to which MU-MIMO is applied are likely to degrade in performance compared with a case where no MU multiplexing is applied. Thus, even when HARQ retransmission is applied, enhancement in the performance by retransmission is unlikely to occur. Meanwhile, application of HARQ retransmission for packets that are not MU-multiplexed is likely to enhance the performance by retransmission, Thus, according to Method 2, since no HARQ retransmission pattern is assigned to a packet to which MU-MIMO is applied, signaling for RU allocation patterns including HARQ information can be reduced.

Note that, although the number of tones for four RUs when MU-MIMO is applied is configured to 106 tones in FIG. 31, this is because unused 2 tones different from 26 tones forming each of the four RUs are also used when MU-MIMO is applied. Note that, the number of tones used when MU-MEMO is applied is not limited to 106 tones, and may be a different value.

Further, in Method 2, the description has been given of the case where no retransmission packet is assigned to an RU to which MU-MIMO is applied, but the method is not limited to this case, and for example, a retransmission packet may be assigned to an RU to which MU-MIMO is applied.

<Method 3>

FIG. 32 illustrates an exemplary RU allocation information pattern in Method 3.

As illustrated in FIG. 32, HARQ Type (e.g., the presence or absence of HARQ retransmission) is included in some patterns (e.g., Reserved pattern) among RU allocation patterns associated with RU allocation information (RU Allocation).

Further, in FIG. 32, no retransmission packet is assigned to an RU (also referred to as Center 26-tone RU) at the center of a system band; in other words, the RU allocation information indicates that a retransmission packet (i.e., retransmission opportunity for a data signal) is assigned to an RU different from the RU (e.g., Center 26-tone RU) including the center of the system band in FIG. 32.

In FIG. 32, in the RU allocation pattern associated with RU Allocation. RU #5, which is a Center 26-tone RU, is assigned a new packet but no retransmission packet, for example. Further, in FIG. 32, other RUs (e.g., RU #1 to RU #4 and RU #6 to RU #9) different from RU #5 are assigned any of a new packet and a retransmission packet.

The packets assigned to Center 26-tone RU are affected by interference due to a DC offset of the receiver, herein, and thus are likely to degrade in performance compared with packets assigned to other RUs. Thus, the impact on performance degradation because of not assigning retransmission packets to Center 26-tone RU is small as in Method 3. In other words, the packets to be assigned to Center 26-tone RU is likely to degrade in performance compared with RUs different from Center 26-tone RU. Thus, even when HARQ retransmission is applied, enhancement in the performance by retransmission is unlikely to occur. Meanwhile, application of HARQ retransmission for packets that are assigned to RUs different from Center 26-tone RU is likely to enhance the performance by retransmission.

Therefore, according to Method 3, no HARQ retransmission pattern is assigned to a packet assigned to Center 26-tone RU, so that signaling for RU allocation patterns including HARQ information can be reduced. In FIG. 32, since RU #5 is not a target for assignment for retransmission packets, signaling for HARQ information can be reduced by 1 bit as compared with signaling (e.g., 8 bits) for an RU allocation pattern, for example.

Note that, the RU to which no retransmission packet is assigned is not limited to Center 26-tone RU. Assigning no retransmission packets to specific RUs expected to have a low quality compared with another RU (i.e., performance degradation is likely to occur) as in Center 26-tone RU allows obtaining the same effect as with Method 3, for example. The specific RUs that are expected to have a low quality include RUs that are expected to receive interference from another system, for example.

Further, in a case where the specific RU expected to have a low quality changes dynamically, assigning a retransmission packet to the specific RU can be dynamically limited by including an RU allocation information pattern or information on the specific RU in signals, such as beacon signals to be periodically transmitted from an AP to all users (STAs) in connection with the AP.

Methods 1 to 3 have been described thus far. Note that at least two of Methods 1 to 3 may be combined.

As described above, according to the present embodiment, an AP configures the information on retransmission control (e.g., HARQ information, such as HARQ Type) to the resource allocation information (e.g., RU Allocation) included in the common information, in the common information included in the control signal indicating MU transmission.

Accordingly, adding a field (e.g., subfield) for indicating HARQ information in the common information is unnecessary, and the signaling amount for the common information can be reduced, compared with the format of 11ax, for example.

Note that, in the present embodiment, HARQ information included in the user information may be configured in accordance with HARQ information included in the common information, as in Embodiment 2.

Further, although the description has been given of the case where HARQ Type is assigned to a Reserved pattern of RU allocation information (e.g., RU Allocation), it is not limited to this case. The size of the RU allocation information (e.g., the number of bits or the number of patterns) may be increased, and HARQ Type may be allocated in the increased bit sequence, for example.

Further, in the present embodiment, the description has been given with SIG-B of 11ax (i.e., operation for downlink communication), as an example. The present embodiment is, however, not limited to this, and may be applied to an operation for uplink communication.

Each embodiment of the present disclosure has been described, thus far.

Other Embodiments (1) In the above embodiments, the description has been given of an exemplary configuration, using a format of a control signal for MU transmission in 11ax as the basis, but the format to which an embodiment of the present disclosure is applied is not limited to the format of 11ax. One embodiment of the present disclosure can be applied to MU transmission to be controlled using the common information and user information, for example.

Figure 33:
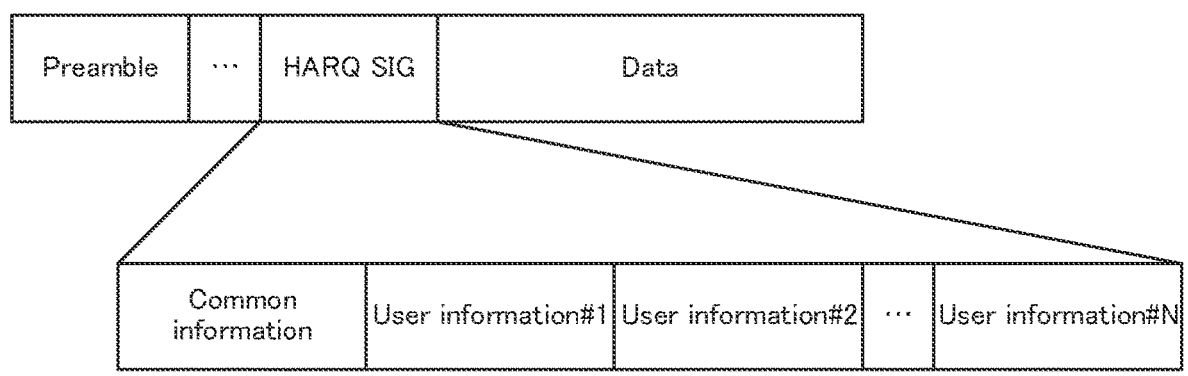
FIG. 33 is a diagram illustrating an exemplary control signal format according to another embodiment.

The format of a control signal indicating MU transmission is not limited to the format specified in 11ax (e.g., SIG-B or Trigger frame), tier example, and an HARQ dedicated SIG format (referred to as HARQ-SIG, hereinafter) may be added as illustrated in FIG. 33. HARQ-SIG may include common information and user information, and the common information may include at least HARQ information (e.g., HARQ Type), for example.

(2) The alignment order of user information (User Info fields) of Trigger frames may be configured with distinction between new packets and retransmission packets, for example.

Figure 34:
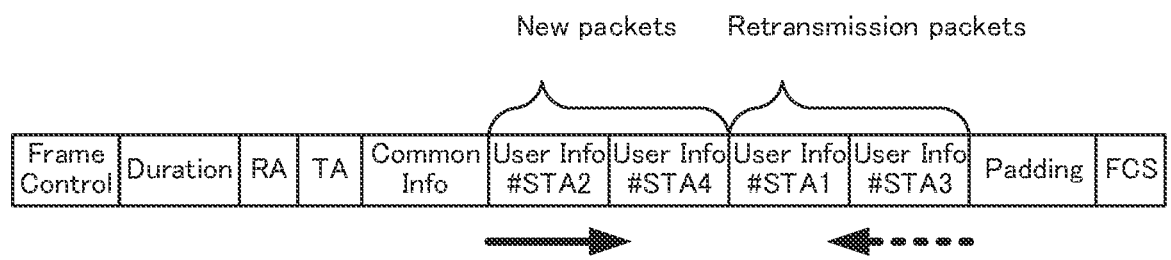
FIG. 34 is a diagram illustrating an exemplary Trigger frame format according to another embodiment.

As illustrated in FIG. 34, the user information of new packets may be arranged in preference to the user information of retransmission packets, for example. In FIG. 34, for example, the STA for Which HARQ Type indicated in the common information is a new packet decodes User Info field sequentially from the beginning of the user information (in the order indicated by the solid arrow). Further, the STA for which HARQ Type indicated in the common information is a retransmission packet decodes User Info field sequentially from the end of the user information (in the order indicated by the dashed arrow), for example.

Thus, the STA performing retransmission can reduce the decoding processing amount for the user information, for example. Note that the arrangement order of the new packets and retransmission packets may be reversed from the case illustrated in FIG. 34.

(3) The units of HARQ retransmissions are assumed to be, for example, MPDUs, which are units of MAC-protocol data. Further, an Aggregate MPDU (A-MPDU) is formed by concatenating MPDUs, for example.

The signaling identifying a Low Density Parity Check (LDPC) block, for example, may be included in the common information or user information. Thus, the AP or STA can identify an MPDU in A-MPDU in PHY (physical layer).

Figure 35:
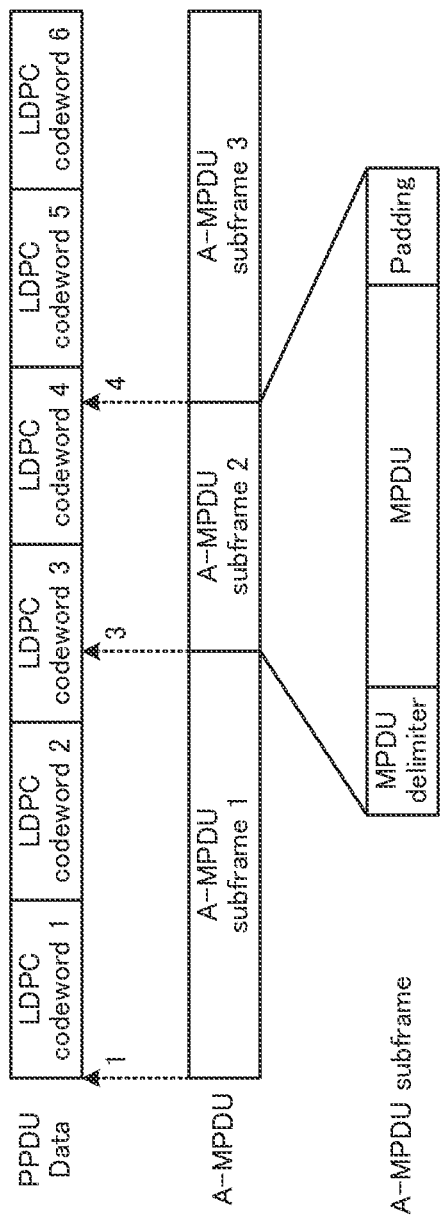
FIG. 35 is a diagram illustrating an exemplary PPDU format according to another embodiment.

Further, an LDPC codeword number including the top part of each MPDU or each A-MPDU subframe (or LDPC codeword number including the last part of each MPDU) may be signaled, for example. In the example of FIG. 35, LDPC codeword numbers including the beginning of MPDUs (e.g., A-MPDU subframes 1, 2, and 3) are 1, 3, and 4, so that "1," "3," and "4" may be signaled with common information or user information of the preamble. Thus, a corresponding MPDU retransmission is made possible by retransmission of LDPC codeword from the beginning of LDPC codeword of the MPDU for which retransmission is requested to the beginning of the next LDPC codeword (or retransmission from the last part immediately before the MPDU for which retransmission is requested to the last part of this MPDU). Further, an MPDU length may be adjust by, for example, addition of padding or the like in order that the boundaries between LDPC blocks and MPDUs are aligned.

Further, HARQ Type for each of a plurality of MPDUs included in one packet for each STA may be included in the common information, for example. In this case, for example, when at least one MPDU for which retransmission is indicated is included in MPDUs included in one packet, the AP or STA may configure a retransmission format for the format of the user information for this packet. Alternatively, the AP or STA may configure a retransmission format or a new transmission mat for the format of the user information for the packet based on the ratio of MPDUs for which retransmission is indicated and MPDUs for which new transmission is indicated among the MPDUs included in one packet, for example.

Further, the units of HARQ retransmissions may be concatenated in units of PPDUs or units of PSDUs instead of units of MPDUs, and HARQ retransmission may be performed in units of PPDUs or units of PSDUs. The units of HARQ retransmissions may be units of LDPC codewords. In order to perform the retransmission of each block described above, HARQ Type of each block may be included in the common information or the user information.

(4) In the above embodiments, the description has been given, with HARQ Types (e.g., either new or retransmission (either CC or IR)), RV, or NDI as an example of HARQ information. The HARQ information is, however, not limited to the above information. In a case where a plurality of APs and STAs include an HARQ buffer (e.g., referred to as HARQ Process) and HARQ controls for a plurality of packets are performed in parallel, for example, an HARQ Process ID may be included in, for example, the user information.

(5) In the above embodiments, the case has been described where downlink radio transmission apparatus 100 and uplink radio reception apparatus 400 are each an AP and downlink radio reception apparatus 200 and uplink radio transmission apparatus 300 are each an STA. Downlink radio transmission apparatus 100 and uplink radio reception apparatus 400 may be each an STA, for example, without being limited to the above case, however.

(6) At least two of Embodiments 1, 2, and 3 may be applied in combination.

(7) The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by a single LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication (collectively referred to as a communication apparatus). Such a communication apparatus may include a radio transmitter/receiver (transceiver) and a processor/control circuitry. The radio transmitter/receiver may include a receiver and a transmitter therein or as its functions. The radio transmitter/receiver (transmitter, receiver) may include a Radio Frequency (RF) module and one or more antennas. The RF module may include an amplifier, an RF modulator/demodulator, and/or the like. Non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle provided with communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A base station according to one embodiment of the present disclosure includes: control circuitry, which, in operation, generates common information and user specific information, the common information including information relating to retransmission control for each of a plurality of users and being common to the plurality of users, the user specific information being specific to each of the plurality of users and corresponding to the information relating to the retransmission control; and transmission circuitry, which, in operation, transmits a control signal including the common information and the user specific information.

In one embodiment of the present disclosure, the information relating to the retransmission control indicates whether transmission of a data signal is a new transmission or a retransmission for each of the plurality of users.

In one embodiment of the present disclosure, the information relating to the retransmission control includes a value of each of the plurality of users.

In one embodiment of the present disclosure, the information relating to the retransmission control includes a value common to the plurality of users.

In one embodiment of the present disclosure, the control circuitry determines a configuration of the user specific information based on the information relating to the retransmission control.

In one embodiment of the present disclosure, the control circuitry configures a parameter relating to the retransmission control in the user specific information, in a case where the information relating to the retransmission control indicates a retransmission, and the control circuitry does not configure the parameter in the user specific information, in a case where the information relating to the retransmission control indicates a new transmission.

In one embodiment of the present disclosure, in a case where the information relating to the retransmission control indicates a retransmission, the control circuitry does not configure, in the user specific information, at least one of a plurality of the parameters configured in the user specific information in a case where the information relating to the retransmission control indicates a new transmission.

In one embodiment of the present disclosure, the control circuitry configures the information relating to the retransmission control in resource allocation information to be included in the common information.

In one embodiment of the present disclosure, the resource allocation information indicates that a retransmission opportunity for a data signal is assigned to a resource different from a resource used for multiple-user multiplexing.

In one embodiment of the present disclosure, the resource allocation information indicates that a retransmission opportunity for a data signal is assigned to a resource different from a resource including a center of a system band.

In one embodiment of the present disclosure, the control circuitry configures a parameter of a different type in the user specific information between a case where the information relating to the retransmission control indicates a retransmission and a case where the information relating to the retransmission control indicates a new transmission.

A terminal according to one embodiment of the present disclosure includes: reception circuitry, which, in operation, receives a control signal including common information common to a plurality of users and user specific information specific to each of the plurality of users; and control circuitry, which, in operation, controls a retransmission of a data signal based on information relating to retransmission control for each of the plurality of users and indicated in the common information, and the user specific information corresponding to the information relating to the retransmission control.

A transmission method according to one embodiment of the present disclosure includes: generating, by a base station, common information and user specific information, the common information indicating information relating to retransmission control for each of a plurality of users and being common to the plurality of users, the user specific information being specific to each of the plurality of users and corresponding to the information on the retransmission control; and transmitting, by the base station, a control signal including the common information and the user specific information.

A reception method according to one embodiment of the present disclosure includes: receiving, by a terminal with reception circuitry, a control signal including common information common to a plurality of users, and user specific information specific to each of the plurality of users; and controlling, by the terminal, a retransmission of a data signal based on information relating to retransmission control for each of the plurality of users and indicated in the common information, and the user specific information corresponding to the information relating to the retransmission control.

The disclosure of Japanese Patent Application No. 2019-041687, filed on Mar. 7, 2019, including the specification, drawings and abstract is incorporated herein by reference in its entirety.

INDUSTRIAL APPLICABILITY

An exemplary embodiment of the present disclosure is useful for radio communication systems.

REFERENCE SIGNS LIST

100, 500 Downlink radio transmission apparatus
101, 201, 301, 401 Radio receiver
102, 203, 303, 402 Preamble demodulator
103, 205, 304, 404 Data demodulator
104, 208, 305, 407 Data decoder
105, 409, 502 Scheduler
106, 410, 503 FIARQ information generator
107, 307, 412 Data generator
108, 308, 413 Data encoder
109, 309, 414 Data modulator
110, 212, 310, 415 Preamble generator
111, 213, 311, 416 Radio transmitter
200, 600 Downlink radio reception apparatus
202, 302 Preamble detector
204, 602 HARQ information decoder
206, 405 Data holder
207, 406 HARQ combiner
209, 408 Error determiner
210 ACK/NACK signal generator
211 ACK/NACK signal modulator
300 Uplink radio transmission apparatus
306, 411 HARQ information holder
400 Uplink radio reception apparatus
403 Reception presence/absence detector
501, 601 RU allocation configurator

The invention claimed is:
1. A base station, comprising:
control circuitry, which, in operation, generates common information and user specific information, the common information including information relating to retransmission control for each of a plurality of users and being common to the plurality of users, the user specific information being specific to each of the plurality of users and corresponding to the information relating to the retransmission control; and transmission circuitry, which, in operation, transmits a control signal including the common information and the user specific information, wherein the control circuitry determines a configuration of the user specific information based on the information relating to the retransmission control, and in a case where the information relating to the retransmission control indicates a retransmission, the control circuitry does not configure, in the user specific information, at least one of a plurality of parameters configured in the user specific information in a case where the information relating to the retransmission control indicates a new transmission.

2. The base station according to claim 1, wherein the information relating to the retransmission control indicates whether transmission of a data signal is a new transmission or a retransmission for each of the plurality of users.

3. The base station according to claim 2, wherein the information relating to the retransmission control includes a value of each of the plurality of users.

4. The base station according to claim 2, wherein the information relating to the retransmission control includes a value common to the plurality of users.

5. The base station according to claim 1, wherein
the control circuitry configures a parameter relating to the retransmission control in the user specific information, in a case where the information relating to the retransmission control indicates a retransmission, and
the control circuitry does not configure the parameter in the user specific information, in a case where the information relating to the retransmission control indicates a new transmission.

6. The base station according to claim 1, wherein the control circuitry configures the information relating to the retransmission control in resource allocation information to be included in the common information.

7. The base station according to claim 6, wherein the resource allocation information indicates that a retransmission opportunity for a data signal is assigned to a resource different from a resource used for multiple-user multiplexing.

8. The base station according to claim 6, wherein the resource allocation information indicates that a retransmission opportunity for a data signal is assigned to a resource different from a resource including a center of a system band.

9. The base station according to claim 1, wherein the control circuitry configures a parameter of a different type in the user specific information between a case where the information relating to the retransmission control indicates a retransmission and a case where the information relating to the retransmission control indicates a new transmission.

10. A terminal, comprising:
reception circuitry, which, in operation, receives a control signal including common information common to a plurality of users and user specific information specific to each of the plurality of users; and control circuitry, which, in operation, controls a retransmission of a data signal based on information relating to retransmission control for each of the plurality of users and indicated in the common information, and the user specific information corresponding to the information relating to the retransmission control, wherein a configuration of the user specific information is determined based on the information relating to the retransmission control, and in a case where the information relating to the retransmission control indicates a retransmission, at least one of a plurality of parameters configured in the user specific information in a case where the information relating to the retransmission control indicates a new transmission is not configured in the user specific information.

11. A transmission method, comprising:
generating, by a base station, common information and user specific information, the common information indicating information relating to retransmission control for each of a plurality of users and being common to the plurality of users, the user specific information being specific to each of the plurality of users and corresponding to the information on the retransmission control; and transmitting, by the base station, a control signal including the common information and the user specific information, wherein a configuration of the user specific information is determined based on the information relating to the retransmission control, and in a case where the information relating to the retransmission control indicates a retransmission, at least one of a plurality of parameters configured in the user specific information in a case where the information relating to the retransmission control indicates a new transmission is not configured in the user specific information.

12. A reception method, comprising:
receiving, by a terminal with reception circuitry, a control signal including common information common to a plurality of users, and user specific information specific to each of the plurality of users; and controlling, by the terminal, a retransmission of a data signal based on information relating to retransmission control for each of the plurality of users and indicated in the common information, and the user specific information corresponding to the information relating to the retransmission control, wherein a configuration of the user specific information is determined based on the information relating to the retransmission control, and in a case where the information relating to the retransmission control indicates a retransmission, at least one of a plurality of parameters configured in the user specific information in a case where the information relating to the retransmission control indicates a new transmission is not configured in the user specific information.

* * * * *